United States Patent [19]
Koike et al.

[11] Patent Number: 5,473,455
[45] Date of Patent: Dec. 5, 1995

[54] DOMAIN DIVIDED LIQUID CRYSTAL DISPLAY DEVICE WITH PARTICULAR PRETILT ANGLES AND DIRECTIONS IN EACH DOMAIN

[75] Inventors: Yoshio Koike; Kenji Okamoto; Seiji Tanuma; Tsuyoshi Kamada; Yoshiro Katayama; Makoto Morishige; Hidefumi Yoshida; Kazutaka Hanaoka; Syun Tsuyuki, all of Kawasaki, Japan

[73] Assignee: Fujitsu Limited, Kawasaki, Japan

[21] Appl. No.: 993,390

[22] Filed: Dec. 18, 1992

[30] Foreign Application Priority Data

| | | | |
|---|---|---|---|
| Dec. 20, 1991 | [JP] | Japan | 3-338688 |
| Dec. 20, 1991 | [JP] | Japan | 3-338695 |
| Dec. 20, 1991 | [JP] | Japan | 3-338781 |
| Dec. 20, 1991 | [JP] | Japan | 3-338807 |
| Dec. 20, 1991 | [JP] | Japan | 3-338815 |
| Dec. 20, 1991 | [JP] | Japan | 3-338819 |
| Jan. 31, 1992 | [JP] | Japan | 4-016669 |
| Jul. 15, 1992 | [JP] | Japan | 4-188174 |
| Jul. 24, 1992 | [JP] | Japan | 4-198672 |

[51] Int. Cl.$^6$ ........................................... G02F 1/1337
[52] U.S. Cl. ............................................. 359/76; 359/78
[58] Field of Search .................................... 359/76, 78

[56] References Cited

U.S. PATENT DOCUMENTS

| | | | |
|---|---|---|---|
| 4,496,220 | 1/1985 | Goscianski | 359/76 |
| 4,521,080 | 6/1985 | Funada et al. | 359/76 |
| 5,150,236 | 9/1992 | Patel | 359/78 |
| 5,155,611 | 10/1992 | Yamazaki et al. | 359/76 |
| 5,223,963 | 6/1993 | Okada et al. | 359/78 |

FOREIGN PATENT DOCUMENTS

0481700  4/1992  European Pat. Off. .

| | | | |
|---|---|---|---|
| 54-5754 | 1/1979 | Japan . | |
| 63-106624 | 5/1988 | Japan . | |

OTHER PUBLICATIONS

Patent Abstracts of Japan, vol. 7, No. 35, (P175) (Feb. 10, 1983), abstract of JP57-186735 (Nov. 17, 1982).
Patent Abstracts of Japan, vol. 10, No. 212, (P480) (Jul. 24, 1986), abstract of JP61-051125 (Mar. 13, 1986).
Koike et al., "Late-News Paper: A full color TFT-LCD with a Domain-Divided Twisted-Nematic Structure", *SID 1992 International Symposium—Digest of Technical Papers*, pp. 798-802, May, 1992.
Yang, "Two-Domain Twisted Nematic and Tilted Homeotropic Liquid Crystal Displays for Active Matrix Applications", *Conference Record of the 1991 International Display Research Conference*, pp. 68-72, Oct. 15, 1991.
"Controlled Two-Domain and Four-Domain Twisted Nematic Liquid Crystal Displays", *IBM Technical Disclosure Bulletin*, pp. 199-200 vol. 33, No. 1B, Jun., 1990.

*Primary Examiner*—Anita Pellman Gross
*Attorney, Agent, or Firm*—Staas & Halsey

[57] ABSTRACT

A liquid crystal display device comprising different liquid crystal aligning domains in each of a plurality of unit regions for improving a characteristic of a viewing angle. In at least one of the liquid crystal aligning domains, molecules of the liquid crystal near the first alignment layer are aligned in a first pretilt direction and at a first pretilt angle and molecules of the liquid crystal near the second alignment layer are aligned in a second pretilt direction generally opposite the first pretilt direction and at a second pretilt angle. The first pretilt angle is larger than the second pretilt angle so that molecules of the liquid crystal located intermediately between the first and second plates rise in accordance with the first pretilt angle when voltage is applied. This feature can be widely used in combination with a suitably selected arrangement of the other liquid crystal aligning domain for reducing rubbing steps and photolithography steps.

43 Claims, 39 Drawing Sheets

(FROM GLASS SURFACE)

(FROM ALIGNMENT LAYER SURFACE)

α > β > γ

α > β

DOMAIN DIVIDED LIQUID CRYSTAL DISPLAY DEVICE WITH PARTICULAR PRETILT ANGLES AND DIRECTIONS IN EACH DOMAIN

BACKGROUND OF THE INVENTION

1. Field of the Invention

The present invention relates to a liquid crystal display device having different liquid crystal aligning domains in each of a plurality of minute unit regions.

2. Description of the Related Art

A liquid crystal display device comprises a liquid crystal panel having a pair of opposite transparent glass plates and a liquid crystal inserted between the glass plates. One of the glass plates has a common electrode and an alignment layer in the inner surface thereof and the other glass plate has a plurality of minute picture electrodes and an alignment layer in the inner surface thereof. Recently, an active matrix circuit with the picture electrodes is often formed in the latter glass plate. The alignment layers are treated by rubbing. In addition, polarizers are arranged on the outside of the glass plates, respectively. Usually, the polarizers are arranged so that the transmitting axes of the polarized light thereof are perpendicular to each other (normally white mode). The present invention is described below with reference to this normally white mode but it is needless to say that the present invention is applicable to a normally black mode (the transmitting axes of the polarized light are parallel to each other) regarding technically identical matters.

In the liquid crystal panel, molecules of the liquid crystal are aligned with a pretilt in accordance with the rubbing directions of the alignment layers in the glass plates. In the twisted nematic liquid crystal display device in which polarizers are arranged perpendicular to each other, the rubbing directions of the alignment layers in the glass plates are perpendicular to each other, and molecules of the liquid crystal twist helically from one of the glass plates to the other. Thus, when voltage is not applied to the liquid crystal, molecules of the liquid crystal are maintained in a condition maintaining the initial twist and the initial pretilt, and the incident light rotatingly propagates the liquid crystal along the twist and emits therefrom. In this case, a white spot is obtained in a normally white mode in which the polarizers are arranged perpendicular to each other. When voltage is applied, molecules of the liquid crystal rise, and the action of the birefringence of the liquid crystal becomes weak and the above rotating performance of the polarized light becomes weak, so that it becomes difficult for the incident light to transmit the liquid crystal display and a black spot is obtained. In this way, it is possible to form an entire image on the display having a contrast of brightness and darkness, by controlling the voltage applied to the liquid crystal.

When the voltage is applied to the liquid crystal, molecules of the, liquid crystal rise depending on the pretilt but all of the molecules of the liquid crystal between the opposite glass plates do not rise identically; some part of the molecules of the liquid crystal near the glass plates are restricted by the alignment layers and rises slightly, and some of the molecules of the liquid crystal located intermediately between the glass plates rise. Accordingly, it is mainly the performance of the molecules of the liquid crystal located intermediately between the glass plates that forms the black spot when voltage is applied.

Molecules of the liquid crystal have an elongated rod-like shape, and an action of birefringence differs when the polarized light impinges upon the liquid crystal from the direction of its long axis or from the direction of its short axis. Molecules of the liquid crystal do not rise perpendicular to the glass plates but rise at a certain angle relative to the glass plates. Accordingly, when molecules of the liquid crystal rise at a certain angle and an observer views the display from various angles, the direction of the long axis of the molecules of the liquid crystal relative to the observer varies and a variation of the transmittance of light occurs, resulting in a change in the obtained grayscale. For this reason, the contrast of brightness and darkness in the image is reduced depending on the position of the observer. This is generally recognized as a characteristic of a viewing angle of the liquid crystal.

To solve this problem, Japanese Unexamined Patent Publication (Kokai) No. 54-5754 discloses a liquid crystal display device having two different liquid crystal aligning domains in each of a plurality of minute unit regions. In this case, the direction of twist is different in the respective domains. Also, Japanese Unexamined Patent Publication (Kokai) No. 63-106624 discloses a liquid crystal display device having two different liquid crystal aligning domains in each of a plurality of minute unit regions. In this case, the direction of alignment is different in the respective domains. This domain divided liquid crystal display device may solve the characteristic viewing angle problem of the liquid crystal, by averaging two different viewing angle characteristics.

However, to obtain a liquid crystal display device having two different liquid crystal aligning domains in a minute unit region, it is necessary to effect an alignment treatment, i.e., a rubbing, to each of the alignment layers in one direction and then in another direction, using a mask or the like having minute openings, and such an alignment treatment should be made twice for each alignment layer. Also, it is known to form the mask having minute openings on the alignment layer by a photolithographic technique. A photo-resist is applied to the alignment layer, and minute openings are formed in the resist by a photolithographic technique. The alignment layer with the resist is then rubbed by a rubbing roller and the resist is removed from the alignment layer. This operation is then repeated with a resist having different minute openings and another rubbing.

Accordingly, there is an increase in the number of manufacturing steps for obtaining the domain divided liquid crystal display device which presents a problem. Also, there is a problem in that the rubbed alignment layers are damaged by the subsequent photolithographic operations, and the quality of the alignment layers deteriorate.

SUMMARY OF THE INVENTION

The object of the present invention is to provide a liquid crystal display device in which different liquid crystal aligning domains can be easily and surely obtained.

Another object of the present invention is to provide a liquid crystal display device with different liquid crystal aligning domains that operates with stability and provides a wide viewing angle.

According to the present invention, there is provided a liquid crystal display device comprising first and second opposed plates having facing inner surfaces; a first electrode means and a first alignment layer means arranged on the inner surface of the first plate; a second electrode means and a second alignment layer means arranged on the inner surface of the second plate; a liquid crystal inserted between the first and second plates and having a twisting nature between the first and second plates; the first and second alignment layer means forming in pairs a plurality of minute unit regions, each of which is subdivided into first and second different liquid crystal aligning domains; and the first and second alignment layer means being arranged and treated so that, in at least the first liquid crystal aligning domain, molecules of the liquid crystal near the first alignment layer means are aligned along a first line with a first pretilt direction and a first pretilt angle and molecules of the liquid crystal near the second alignment layer means are aligned along a second line perpendicular to the first line with a second pretilt direction and a second pretilt angle; the second pretilt direction being generally opposite the first pretilt direction and the first pretilt angle being larger than the second pretilt angle, whereby molecules of the liquid crystal located intermediately between the first and second plates rise in accordance with the first pretilt angle when voltage is applied between the first and second electrode means.

With this arrangement, it is possible to obtain a high quality liquid crystal display device with different liquid crystal aligning domains that can be fabricated with a reduced number of manufacturing steps. Especially, it is possible to obtain a liquid crystal display device with different liquid crystal aligning domains by a single rubbing operation in at least one of the alignment layer means of the opposite plates.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
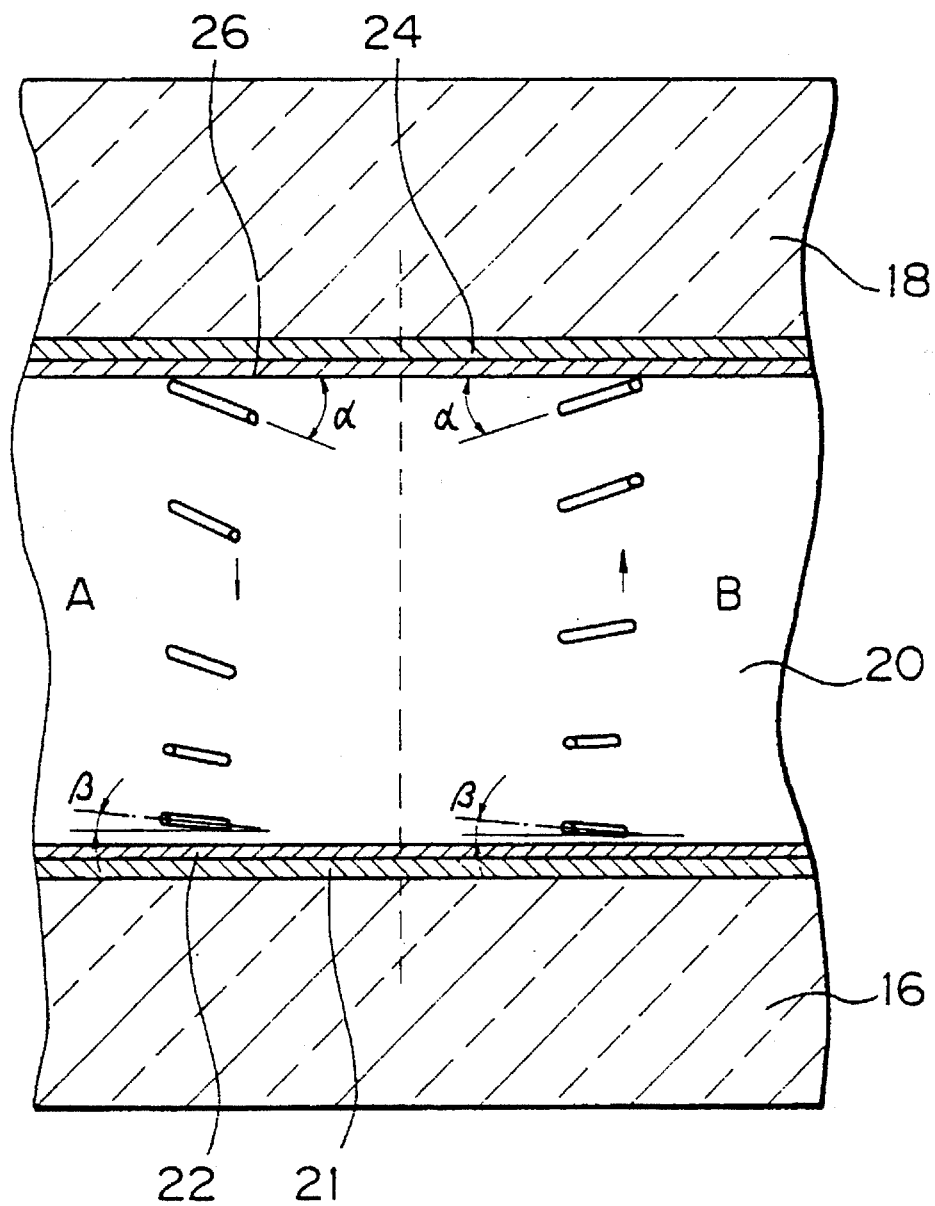
FIG. 1 is a diagrammatic cross-sectional view of a liquid crystal display device according to the first embodiment of the present invention.
Figure 3:
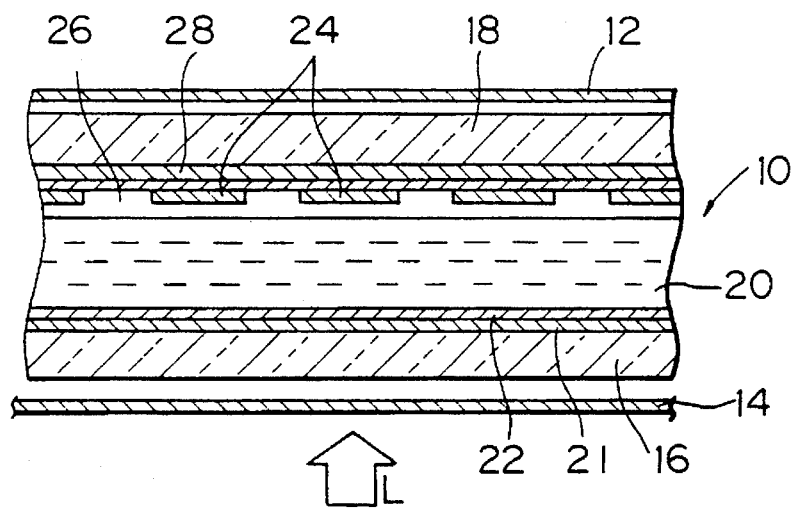
FIG. 3 is a cross-sectional view of the liquid crystal display device of FIG. 1, including polarizers and pixel electrodes.

FIGS. 1 and 3 show a liquid crystal display device according to the first embodiment of the present invention, comprising a liquid crystal panel 10 and polarizers 12 and 14 on either side of the liquid crystal panel 10. The liquid crystal panel 10 comprises a pair of opposite transparent glass plates 16 and 18 and a twisted nematic liquid crystal 20 inserted between the glass plates 16 and 18. In the embodiment, a light from a source (not shown) is incident to the liquid crystal panel 10 from one of the glass plates 16, as shown by the arrow L, and an observer views the liquid crystal panel 10 from the side opposite the light incident. In the description below, the glass plate 16 on the light incident side is called a lower glass plate, and the glass plate 18 on the observer side is called an upper glass plate. It is, of course, possible to reverse the light incident side and the observer side.

A common electrode 21 made of ITO and an alignment layer 22 are arranged on the inner surface of the lower glass plate 16, and a plurality of minute pixel electrodes 24 made of ITO and an alignment layer 26 are arranged on the inner surface of the upper glass plate 18. Also, a storage capacitance electrode 28 is provided in the upper glass plate 18 in an overlapping relationship with the pixel electrode 24 via an insulating layer.

Figure 4:
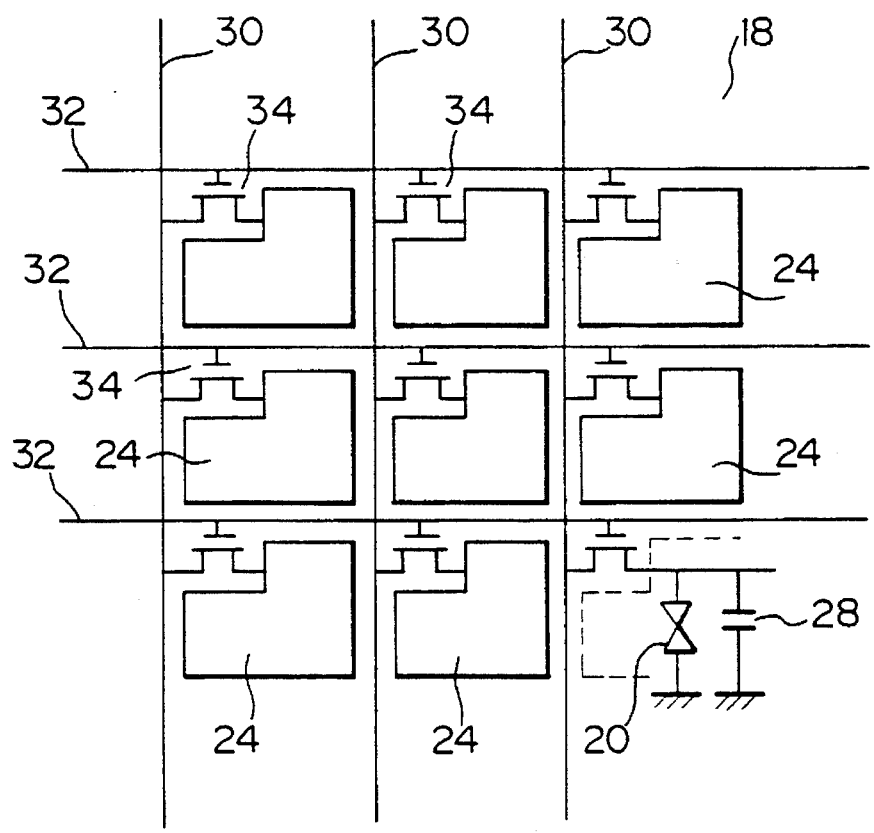
FIG. 4 is a view of an active matrix circuit.

FIG. 4 shows an active matrix circuit provided in the upper glass plate 18. The active matrix circuit comprises data bus lines 30 and gate bus lines 32 extending vertically and horizontally in a matrix, and the pixel electrodes 24 are connected to the data bus lines 30 and the gate bus lines 32 via transistors 34, respectively. At the lower right portion of FIG. 4, an equivalent circuit of the storage capacitance electrode 28 provided parallel to the liquid crystal 20 is shown.

The present invention relates to a domain divided liquid crystal display device that has different liquid crystal aligning domains A and B in each of the minute unit regions, as shown in FIG. 1. For an easier understanding of the present invention, a basic feature of the domain divided liquid crystal display device will be described here with reference to FIGS. 5A to 7.

Figure 5A:
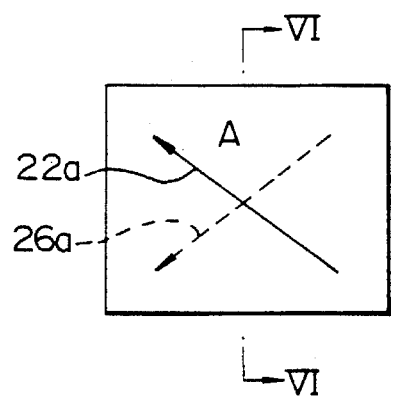
FIGS. 5A to 5C are views illustrating the twisted nematic liquid crystal.

FIG. 5A shows a diagrammatic representation of the treatment of the alignment layer 22 of the lower glass plate 16 and the alignment layer 26 of the upper glass plate 18 in one of the liquid crystal aligning domains A. A solid line arrow 22a illustrates the direction of rubbing the alignment layer 22 of the lower glass plate 16 and a broken line arrow 26a illustrates the direction of rubbing the alignment layer 26 of the upper glass plate 18. The solid line arrow 22a is perpendicular to the broken line arrow 26a. It is known that the rubbing is carried out by rubbing the surface of the alignment layers 22 and 26 with a fibrous rubbing material and the liquid crystal 20 is aligned in a pretilt direction and at a pretilt angle in accordance with the direction of the rubbing.

Figure 5B:
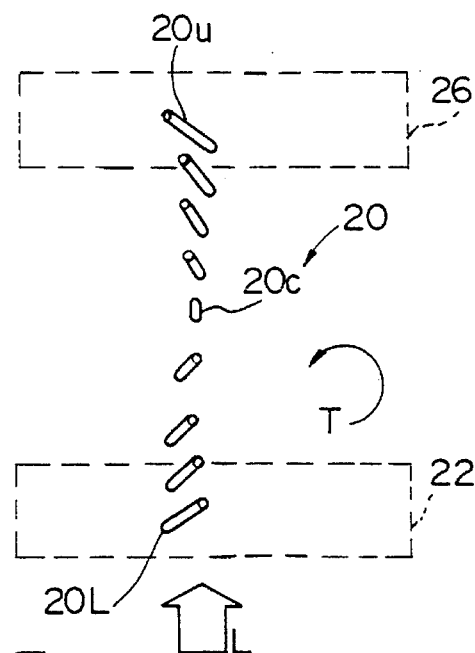

FIG. 5B shows the manner of the twist of the twisted nematic liquid crystal 20. Some of the molecules of the liquid crystal 20 located near the alignment layer 22 of the lower glass plate 16 are represented by the numeral 20L, some of the molecules of the liquid crystal 20 located near the alignment layer 26 of the upper glass plate 18 are represented by the numeral 20U, and some of the molecules of the liquid crystal 20 located intermediately between the lower and upper glass plates 16 and 18 are represented by the numeral 20C. The liquid crystal 20 twists or rotates, as shown by the arrow T, in the left turning direction in the embodiment.

Figure 5C:
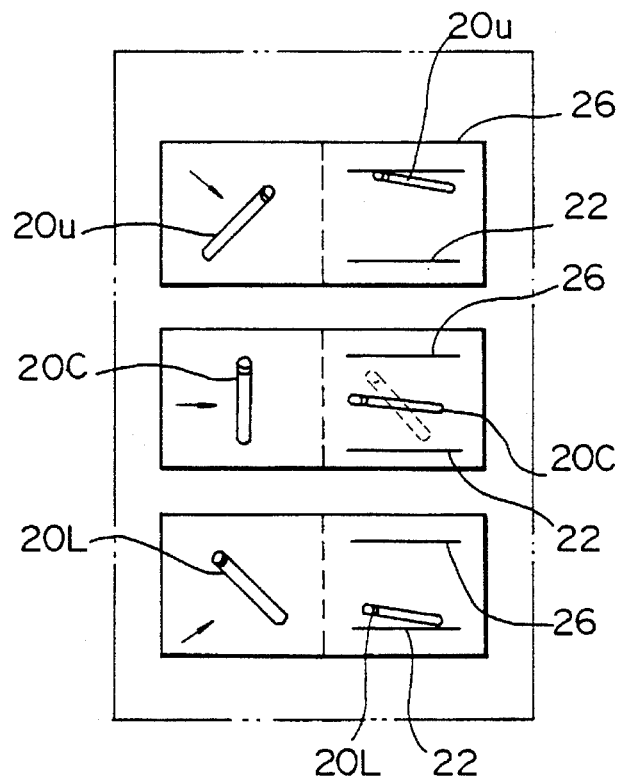

FIG. 5C shows the lower, upper and intermediate molecules of the liquid crystal 20L, 20U, and 20C, respectively. The Figures on the left side show the plane views of the molecules, viewed from the upper glass plate 18, and the Figures on the right side show the elevational cross sectional views of the molecules, viewed from the arrows in the plane views, respectively.

The lower molecule 20L of the liquid crystal 20 has a long axis directed at an angle of 45 degrees from the right bottom to the left top in the plane view, and a pretilt in which the left end of the lower molecule 20L rises slightly relative to the alignment layer 22 in the elevational view. The intermediate molecule 20C has a long axis directed vertically from the bottom to the top in the plane view, and a pretilt in which the left end of the lower molecule 20L rises slightly relative to the alignment layer 22 in the elevational view. The upper molecule 20U has a long axis directed at an angle of 45 degrees from the left bottom to the right top in the plane view, and a pretilt in which the left end of the lower molecule 20L rises slightly relative to the alignment layer 22 in the elevational view. In this way, in the elevational views of FIG. 5C, all molecules 20L, 20C and 20U of the liquid crystal 20 rise identically, i.e., have the same pretilt direction and the same pretilt angle when viewed from one direction, i.e., from the arrows in the plane views of FIG. 5C.

The intermediate molecule 20C is in a substantially horizontal position with the pretilt, similar to the lower and upper molecules 20L and 20U, when voltage is not applied to the liquid crystal 20. The intermediate molecule 20C rises to a considerable angle, as shown by the broken line in FIG. 5C, when the voltage is applied to the liquid crystal 20. The rising angle of the intermediate molecule 20C is larger than that of the lower and upper molecules 20L and 20U. Accordingly, the optical characteristic of the liquid crystal 20 depends on the behavior of the intermediate molecules 20C.

Figure 6A:
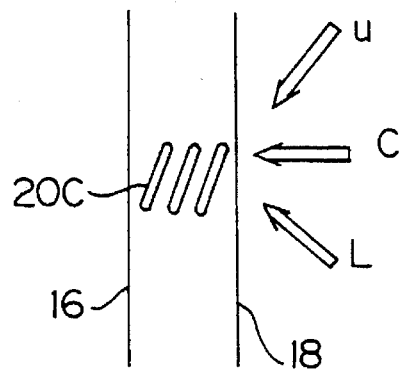
FIGS. 6A and 6B are views illustrating a characteristic of a viewing angle.
Figure 6B:
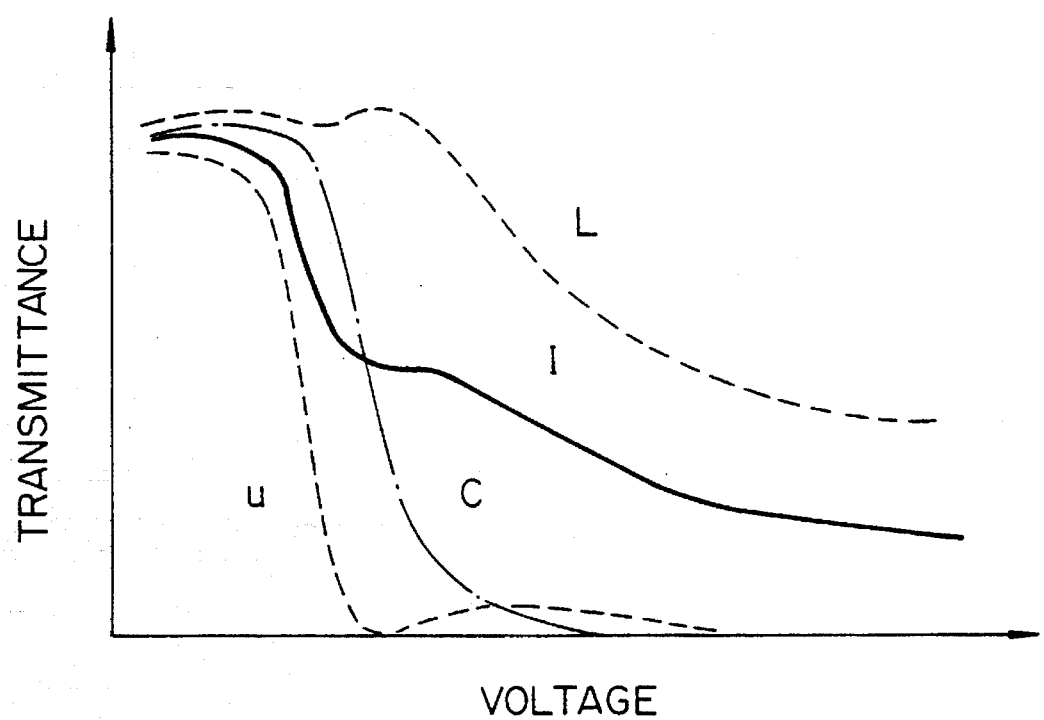

FIG. 6A shows that an observer views the liquid crystal display device from various directions, and FIG. 6B shows the T-V characteristic of the viewing angle of the liquid crystal display device. Arrow C shows that the observer views the vertical liquid crystal display device from the normal to the upper glass plate 18. Arrow U shows that the observer views the vertical liquid crystal display device from the upper position and Arrow L shows that the observer views the vertical liquid crystal display device from the lower position. The intermediate molecules 20C are aligned, as described with reference to FIGS. 5A to 5C.

The T-V characteristic of the viewing angle when the observer views the vertical liquid crystal display device from the normal is shown by the curve C in FIG. 6B. When the observer views the vertical liquid crystal display device from the upper position (from the direction U in FIG. 6A), the value of the birefringence of the intermediate molecules 20C of the liquid crystal 20 becomes relatively small, and the display becomes relatively dark, as shown by the broken line curve U in FIG. 6B. Inversely, when the observer views the vertical liquid crystal display device from the lower position (from the direction L in FIG. 6A), the value of the birefringence of the intermediate molecules 20C of the liquid crystal 20 is relatively large and the amount of the light transmitting the liquid crystal 20 is relatively high, as shown by the broken line curve L in FIG. 6B. In this case, the display becomes relatively bright even though a black or gray spot is desired. In this way, in the liquid crystal aligning domain A, the display viewed from the upper position is dark and the display viewed from the lower position is bright.

Therefore, it has been proposed that the characteristic U and the characteristic L be added and the sum divided by two. The curve I is the thus averaged characteristic, which becomes close to the characteristic C, and the characteristic of the viewing angle is improved.

Figure 7:
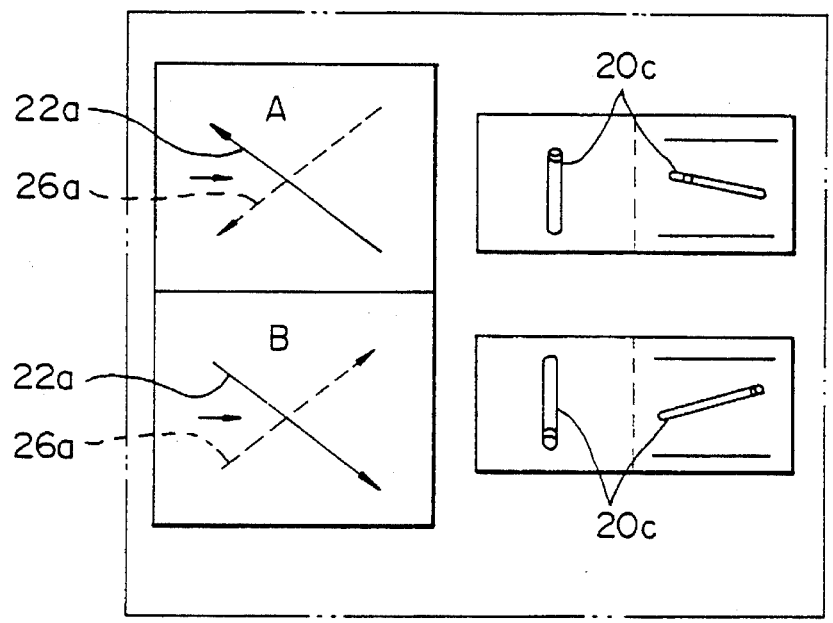
FIG. 7 is a view illustrating an example of a basic arrangement of different liquid crystal aligning domains.

For this purpose, as shown in FIG. 7, another liquid crystal aligning domain B that has a complementary feature to the liquid crystal aligning domain A is provided, and the liquid crystal aligning domains A and B are combined to form one unit region. The alignment directions 22a and 26a of the alignment layers 22 and 26 of the liquid crystal aligning domain B are perpendicular to each other, and are reverse to those of the liquid crystal aligning domain A. Accordingly, the intermediate molecules 20C of the liquid crystal aligning domain B rise in reverse order to those of the liquid crystal aligning domain A, when voltage is applied. In the liquid crystal aligning domain B, the display viewed from the upper position is bright and the display viewed from the lower position is dark, which is reverse to the liquid crystal aligning domain A.

The liquid crystal aligning domains A and B constitute one unit region and a plurality of such unit regions are repeatedly formed in the entire area of the liquid crystal display device. It is desirable that the liquid crystal aligning domains A and B should have fairly small areas since the liquid crystal aligning domains A and B have the different viewing angle characteristics from each other and such a difference should not be recognized by the observer. Preferably, one unit region corresponds to one pixel region surrounded by the data bus lines 30 and the gate bus lines 32. When a color filter having color portions R, G and B is provided in the lower glass plate 16f or a color display, the one pixel region may correspond to each color portion R, G or B. It is also possible that one unit region corresponds to one pixel region times an integer (up to 6 times) or one pixel region times the reciprocal of an integer.

As previously described, to obtain a liquid crystal display device having two different liquid crystal aligning domains A and B in a minute unit region, it is necessary to effect two rubbings for each of the alignment layers 22 and 26 in one direction and then in another direction, using a mask or the like having minute openings. Accordingly, there is an increase in the number of manufacturing steps for obtaining the domain divided liquid crystal display device which presents a problem. Also, there is a problem, that the rubbed alignment layers are damaged by the subsequent photolithographic operations, and the quality of the alignment layers deteriorate. The present invention is directed to overcome these problems.

Referring to FIG. 1, the liquid crystal display device comprises two different liquid crystal aligning domains A and B that are arranged in each of a plurality of minute unit regions, as described. The feature of the present invention is exemplified in the liquid crystal aligning domain B.

In the liquid crystal aligning domain B, molecules of the liquid crystal 20 near the upper alignment layer 26 are aligned along the first line in a first pretilt direction (from the right to the left in FIG. 1) and at a first pretilt angle $\alpha$. Molecules of the liquid crystal 20 near the lower alignment layer 22 are aligned along the second line perpendicular to the first line with a second pretilt direction generally opposite the first pretilt direction and at a second pretilt angle $\beta$. The first pretilt angle $\alpha$ is larger than the second pretilt angle $\beta$.

It will be understood that the twist of the liquid crystal 20 is not clear in FIG. 1 for illustrating the relationship of the pretilt direction and the pretilt angle, but the liquid crystal 20 actually twists. It will thus be understood that the first and second lines along which molecules of the liquid crystal 20 near the upper and lower alignment layers 26 and 22 are aligned correspond to the lines of the arrows 26a and 22a showing the rubbing direction.

In addition, the pretilt directions are defined by the molecules of the liquid crystal 20 from the side thereof and should be compared with those of the left hand views of FIG. 5C. It has been found that molecules of the liquid crystal 20 located intermediately between the lower and upper glass plates 16 and 18 rise in accordance with the first pretilt angle $\alpha$, which is larger than the second pretilt angle $\beta$, when the voltage is applied between the electrodes 21 and 24, as shown by the arrow in FIG. 1.

This feature can be widely used in combination with a suitably selected arrangement of the other liquid crystal aligning domain A for reducing rubbing and photolithography steps.

In the first embodiment, in the liquid crystal aligning domain A, molecules of the liquid crystal 20 near the upper alignment layer 26 are aligned along the first line in the second pretilt direction and at the first pretilt angle α, and molecules of the liquid crystal 20 near the lower alignment layer 22 are aligned along the second line in the second pretilt direction and at the second pretilt angle β. As a result, molecules of the liquid crystal 20 near the lower alignment layer 22 both in the liquid crystal aligning domains A and B, are aligned along the second line in the second pretilt direction and at the second pretilt angle β.

Figure 2B:
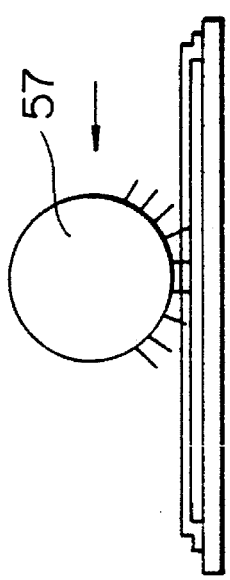
FIGS. 2A and 2B are views illustrating rubbing steps of the liquid crystal display device of FIG. 1.
Figure 2A:
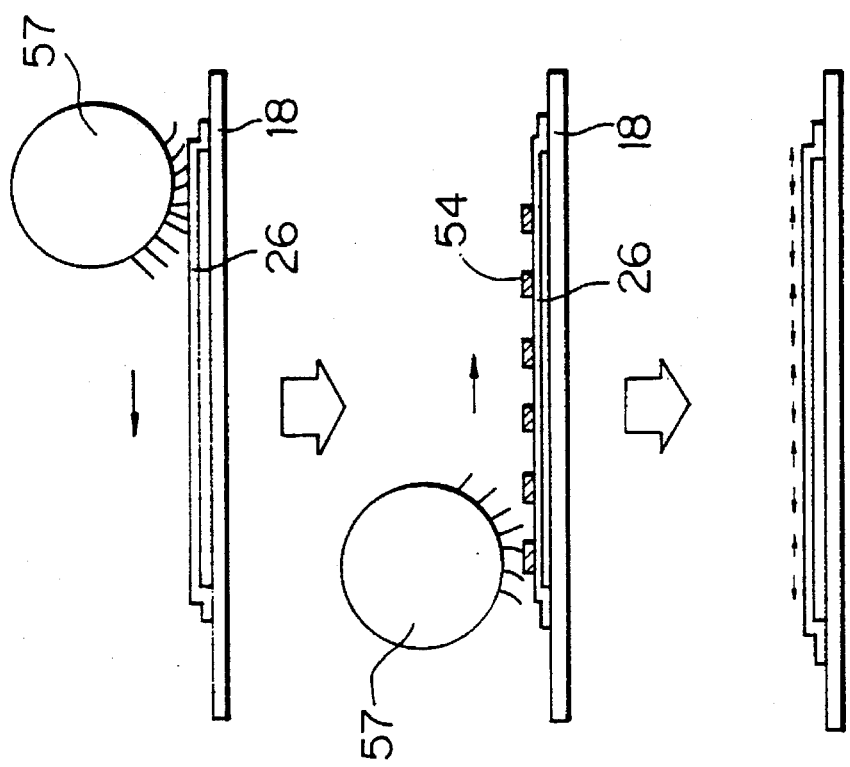

Accordingly, it is possible to obtain the domain divided liquid crystal display device by only one rubbing operation of the lower alignment layer 22. FIG. 2A shows the treatment of the upper alignment layer 26 in which the upper alignment layer 26 is first rubbed in one direction with a rubbing roller 57 having fibrous material wound around it, then a mask 54 is applied to the upper alignment layer 26 and again rubbed in the opposite direction with the rubbing roller 57. Finally, the mask 54 is removed and opposite rubbed minute regions are formed. FIG. 2B shows the treatment of the lower alignment layer 22 with the rubbing roller 57.

Figure 8:
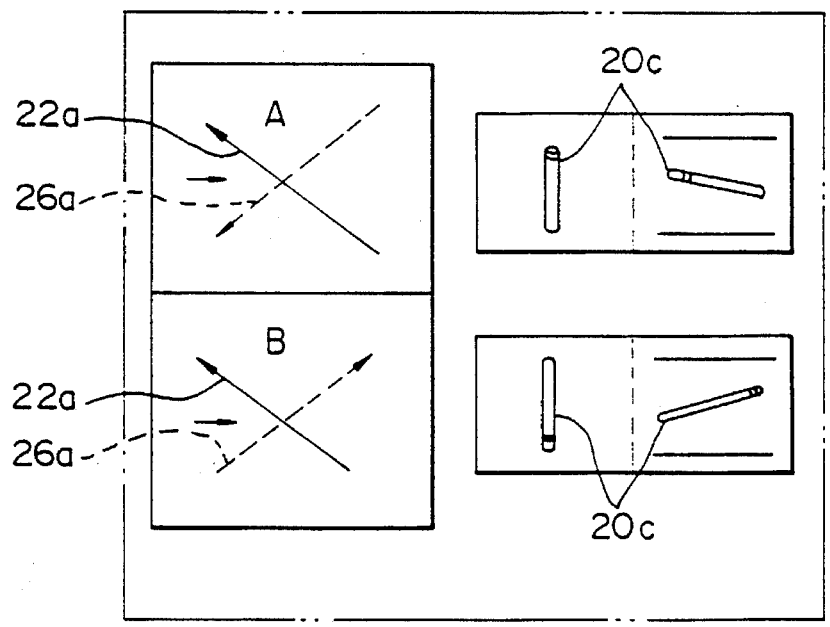
FIG. 8 is a view illustrating an arrangement of different liquid crystal aligning domains of FIG. 1.

FIG. 8 shows the treatment of the upper and lower alignment layers 26 and 22 in which the broken line arrow 26a illustrates the rubbing direction of the upper alignment layer 26 and the solid line arrow 22a illustrates the rubbing direction of the lower alignment layer 22. It will be understood that the rubbing directions 26a and 22a of the upper and lower alignment layers 26 and 22 in the liquid crystal aligning domain A of FIG. 8 are identical to those in the liquid crystal aligning domain A of FIG. 7, and the rubbing direction 26a of the upper alignment layer 26 in the liquid crystal aligning domain B of FIG. 8 is identical to that in the liquid crystal aligning domain B of FIG. 7. Note, the rubbing direction 22a of the lower alignment layer 22 in the liquid crystal aligning domain B of FIG. 8 is in reverse that of the liquid crystal aligning domain domain B of FIG. 7 but identical to that of the liquid crystal alignment domain A of FIG. 8. In the liquid crystal aligning domain B of FIG. 8, molecules of the liquid crystal 20 located intermediately between the upper and lower glass plates 18 and 16 rise depending on the rubbing direction 26a of the upper alignment layer 26 having the larger pretilt angle α. Accordingly, the tilting relationship of molecules of the liquid crystal 20 in the liquid crystal aligning domains A and B of FIG. 8 are identical to those of FIG. 7, as illustrated in the right hand views in FIGS. 7 and 8.

It is possible to obtain the different pretilt angles α and β by several means. For example, it is possible to select the alignment layers 22 and 26 having different properties, for example, JALS-214, JALS-246, JALS-219 and AL-1054 sold by Japan Synthetic Rubber K.K., respectively. It is also possible to vary the manner of the rubbing operations. For example, the rubbing operation of the lower alignment layer 22 is rubbed by the rubbing roller 57 so that the rubbing roller 57 is applied to the lower alignment layer 22 several times by rotating the rubbing roller 57 in one direction and then in the opposite direction with the pressure of the rubbing roller 57 on the lower alignment layer 22 progressively reduced.

Figure 9:
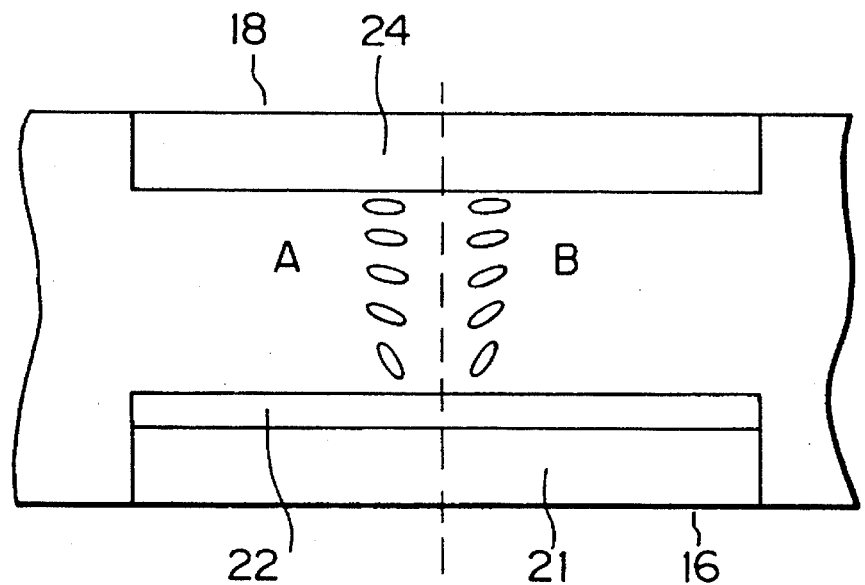
FIG. 9 is a cross-sectional view of a liquid crystal display device according to the second embodiment of the present invention.

FIG. 9 shows the second embodiment of the present invention. In this embodiment, a lower alignment layer 22 is provided on the lower electrode 21 and the rubbing operation is applied to the lower alignment layer 22 to form the liquid crystal aligning domains A and B, similar to the rubbing operation of the upper alignment layer 26 of FIG. 1. But in this embodiment, an upper alignment layer is not provided on the upper electrode 24 and a single rubbing operation is applied to the upper electrode 24, similar to the rubbing operation of the lower alignment layer 22 of FIG. 1. The pretilt angle of the liquid crystal 20 is small when the rubbing is applied to the upper electrode 24, but the rubbing to the upper electrode 24 causes the molecules of the liquid crystal 20 to align in the predetermined direction.

Figure 11A:
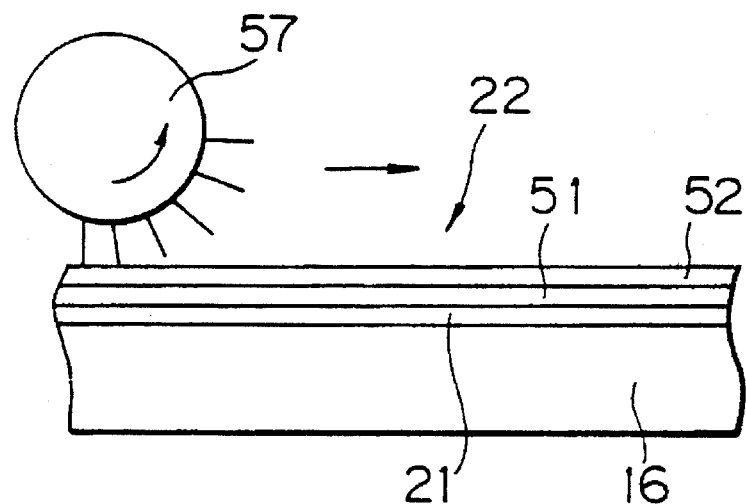
FIGS. 11A and 11B are views illustrating rubbing steps of a modified alignment layer.
Figure 11B:
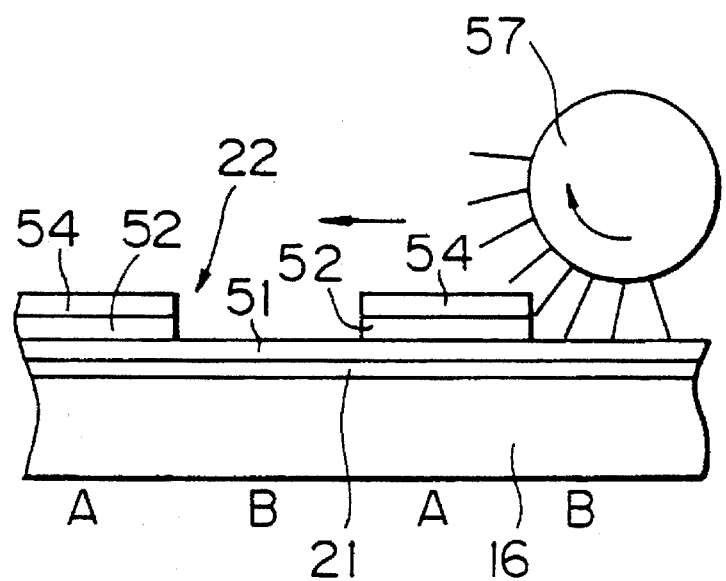

FIGS. 11A and 11B show another example of the alignment layer having the two layer structure. In this embodiment, the alignment layer 22 comprises a first alignment layer 51 laminated on the electrode 21 of the glass plate 16 and a second alignment layer 52 laminated on the first alignment layer 51 and having openings corresponding with one of the liquid crystal aligning domains A and B.

In FIG. 11A, the first and second alignment layers 51 and 52 are applied to the electrode 21 of the glass plate 16 and the rubbing roller 57 is used to rub the second alignment layer 52 in one direction. A mask 54 is then mounted on the second alignment layer 52 and the second alignment layer 52 is etched. The rubbing roller 57 is then used to rub the first alignment layer 51 revealed from the mask 54 in the opposite direction. Finally, the mask 54 is removed from the second alignment layer 52. The formation of the mask 54 and the patterning of the second alignment layer 52 can be effected by a photolithographic process comprising the steps of applying a photoresist on the second alignment layer 52, exposing the photoresist via an appropriate mask, and developing the photoresist in an alkaline developing solution. Thus the mask 54 having openings in correspondence with one of the liquid crystal aligning domains A and B is formed. In the developing step of the photoresist, the second alignment layer 52 is also etched by the developing solution, as shown in FIG. 11B.

With this rubbing operation, it is possible to obtain the alignment layer 22 having differently rubbed portions for forming the liquid crystal aligning domains A and B.

FIGS. 12 to 17 show the third embodiment of the present invention. In this embodiment, in which each of the alignment layers 22 and 26 comprises a first alignment layer 51 and a second alignment layer 52 laminated on the first alignment layer 51, and in each of the liquid crystal aligning domains A and B, molecules of the liquid crystal 20 near the respective glass plates 16 and 18 are aligned with different pretilt directions and different pretilt angles α and β. That is, in the liquid crystal aligning domain A, molecules of the liquid crystal 20 near the upper alignment layer 26 are aligned along the first line in a first pretilt direction (the rubbing direction 26a in the domain A in FIG. 17) and a first pretilt angle α, and molecules of the liquid crystal 20 near the lower alignment layer 22 are aligned along a second line perpendicular to the first line with a second pretilt direction (the rubbing direction 22a in the domain A in FIG. 17) generally opposite the first pretilt direction and a second pretilt angle β. The first pretilt angle α is larger than the second pretilt angle β. Conversely, in the liquid crystal aligning domain B, molecules of the liquid crystal 20 near the upper alignment layer 26 are aligned along the first line with the first pretilt direction the (rubbing direction 26a in the domain B in FIG.17) and the second pretilt angle β, and molecules of the liquid crystal 20 near the lower alignment layer 22 are aligned along the second line perpendicular to the first line with the second pretilt direction (the rubbing direction 22a in the domain B in FIG. 17) and the first pretilt angle α. The first pretilt angle α is larger than the second pretilt angle β.

Figure 17:
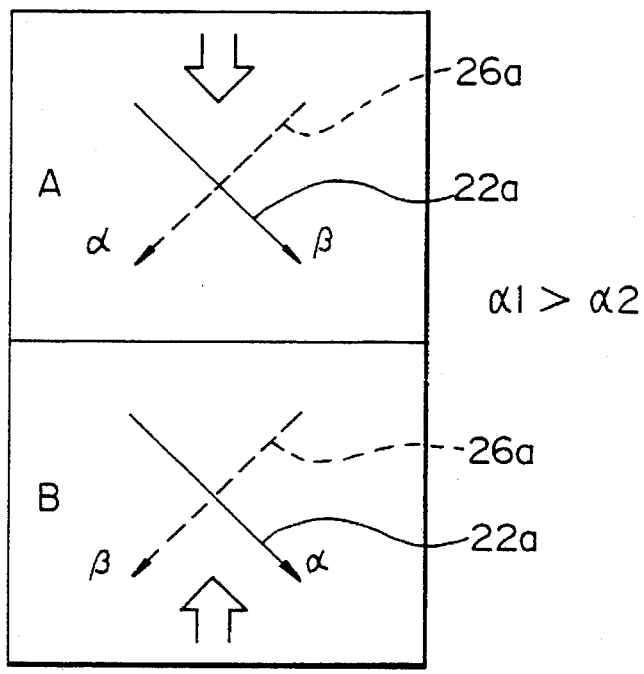
FIG. 17 is a view illustrating an arrangement of different liquid crystal aligning domains of FIG. 12.

In FIG. 17, the broken line arrow 26a illustrates the rubbing direction of the upper alignment layer 26 and the solid line arrow 22a illustrates the rubbing direction of the lower alignment layer 22. It will be understood that the rubbing direction 22a is common in the liquid crystal aligning domains A and B, and the rubbing direction 26a is common in the liquid crystal aligning domains A and B. This means that only a single rubbing operation is enough for each of the upper and lower alignment layers 26 and 22 to obtain the different liquid crystal aligning domains A and B.

As described with reference to FIGS. 7 and 8, molecules of the liquid crystal 20 located intermediately between the upper and lower glass plates 18 and 16 rise depending on the pretilt direction having the larger pretilt angle. Accordingly, intermediate molecules in the liquid crystal aligning domain A rise depending on the rubbing direction 26a having the larger pretilt angle, and intermediate molecules in the liquid crystal aligning domain B rise depending on the rubbing direction 22a having the larger pretilt angle. The thick arrows in FIG. 17 shows the viewing angle in which the characteristic of the curve U is in 6B. Therefore, intermediate molecules of FIG. 17 similarly rise to those of FIGS. 7 and 8.

Figure 14A:
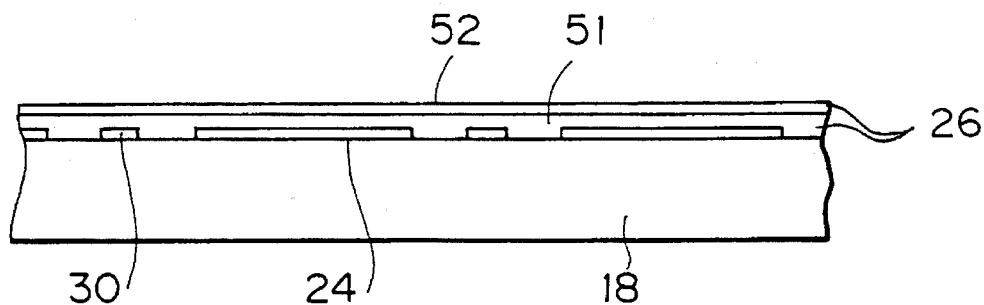
FIGS. 14A to 14C are views illustrating rubbing steps of the liquid crystal display device of FIG. 12.
Figure 14B:
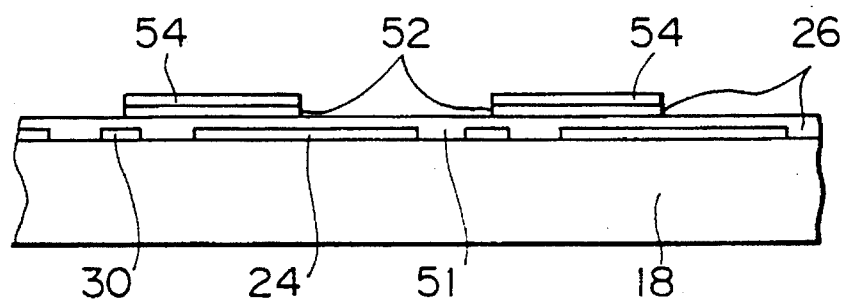
Figure 14C:
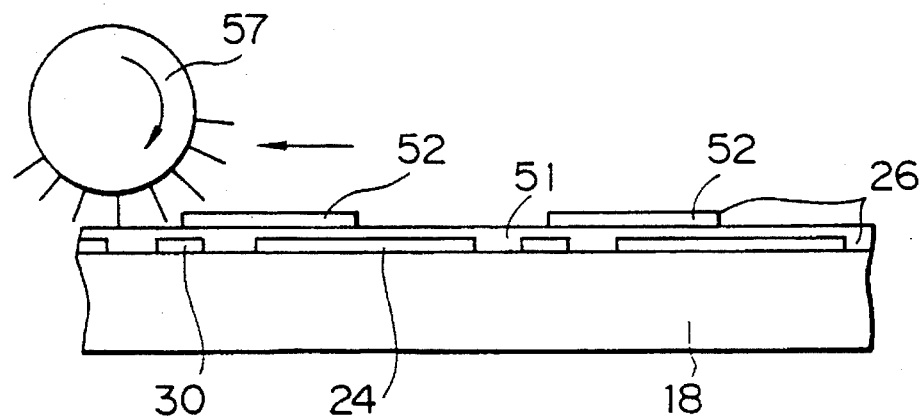

FIGS. 14A to 14C show the rubbing treatment of the upper alignment layer 26 (or the alignment layer 22) comprising the first alignment layer 51 and the second alignment layer 52.

As shown in FIG. 14A, the first and second alignment layers 51 and 52 are applied to the upper glass plate 18 having the electrode 24 and the active matrix circuit. For example, the first alignment layer 51 comprises an inorganic material such as $SiO_2$ or $TiO_2$, and the second alignment layer 52 comprises an organic material such as fully pre-imidized soluble polyimide. The thickness of the first and second alignment layers 51 and 52 may be approximately 500 angstrom, respectively. As shown in FIG. 14B, the patterning of the second alignment layer 52 is then carried out by a photolithographic process comprising the steps of applying a photoresist on the second alignment layer 52, exposing the photoresist via an appropriate mask, and developing the photoresist in an alkaline developing solution. Thus the mask 54 and the second alignment layer 52 are patterned or etched to have openings in correspondence with one of the liquid crystal aligning domains A and B. The second alignment layer 52 dissolves in the alkaline developing solution but the second inorganic alignment layer does not dissolve in the alkaline developing solution.

As shown in FIG. 14C, the mask 54 is then removed and the rubbing roller 57 is used to rub the first and second alignment layers 51 and 52 in the rubbing direction 26a of FIG. 17. Note the first and second alignment layers 51 and 52 are simultaneously treated by this rubbing after the mask 54 is removed.

Accordingly, the second alignment layer 52 and the first alignment layer 51 revealed from the openings of the second alignment layer 52 are rubbed in the same direction. However, when the liquid crystal 20 is inserted between the glass plates 16 and 18, the pretilt angle of the liquid crystal 20 differs depending on whether the liquid crystal 20 is in contact with the second alignment layer 52 or the first alignment layer 51. In the experiment, the liquid crystal 20 that is in contact with the second alignment layer 52 has the larger pretilt angle α of approximately 4 degrees, and the liquid crystal 20 is that in contact with the first alignment layer 51 has the smaller pretilt angle β of approximately 1 degrees.

The first alignment layer 51 of an inorganic material is, for example, AT-L028 sold from Nissan Chemistry K.K. The second alignment layer 52 of an organic material is, for example, JALS-246, JALS-214, AL1054, or JALS-219 sold from Japan Synthetic Rubber K.K. JALS246 or JALS214 provides a pretilt angle greater than 5 degrees, and ALS1054 or JALS219 provides a pretilt angle within the range from 1 to 5 degrees. It is also possible to use organic materials for both the first and second alignment layers 51 and 52. In this case, such organic materials may have different liquid crystal aligning characteristics. It seems at present that AL-1054 is adapted for the first alignment layer 51 since it is resistant to an alkaline etching solution. It is possible to control the pretilt angle by rubbing, owing to the fact that the pretilt angle becomes larger when the rubbing is carried out lightly and the pretilt angle becomes smaller when the rubbing is carried out strongly (for example, the rubbing roller is strongly pressed to the alignment layer, the rubbing roller is repeatedly applied to the alignment layer in many times, or the rubbing roller is applied to the alignment layer at a faster speed). A certain relationship can be experimentally determined between the manner of the rubbing and the pretilt angle. It is also possible to obtain the second alignment layer 52 having openings in any other process, for example, a printing process.

In each of the liquid crystal aligning domains A and B, one of the alignment layers has the larger pretilt angle and the other alignment layer has the smaller pretilt angle, and molecules of the liquid crystal 20 located intermediately between the upper and lower glass plates 18 and 16 rise depending on the pretilt direction having the larger pretilt angle. In this case, it is assumed that performance of some of the molecules of the liquid crystal 20 near the alignment layer having the second pretilt direction opposite the first pretilt direction and the smaller pretilt angle may become unstable when the intermediate molecules of the liquid crystal 20 rise depending on the alignment layer having the first pretilt direction and the larger pretilt angle. Nevertheless, it has been found that the liquid crystal display device according to the present invention can realize a more clear display than that obtained in the prior art, because, according to the present invention, the rubbing operation is carried out once at the end of the liquid crystal alignment process, for providing the different liquid crystal aligning domains A and B. The properties of the alignment layers are not damaged or changed after the rubbing because, according to the present invention, it is possible to assemble the liquid crystal panel under so called "hot" conditions, in a short time after the rubbing of the alignment layers, without any other step or procedure. It is believed that the rubbing treatment is not affected and the effect of the rubbing is stable according to the present invention, compared with the prior art in which the development and the resist removal are effected after the rubbing is carried out. The alignment layer having the smaller pretilt angle serves to align the liquid crystal 20 to twist 90 degrees between the upper and lower glass plates 18 and 16. The turning direction of the liquid crystal in this structure is stably left by the helical power of liquid crystal material.

Figure 15:
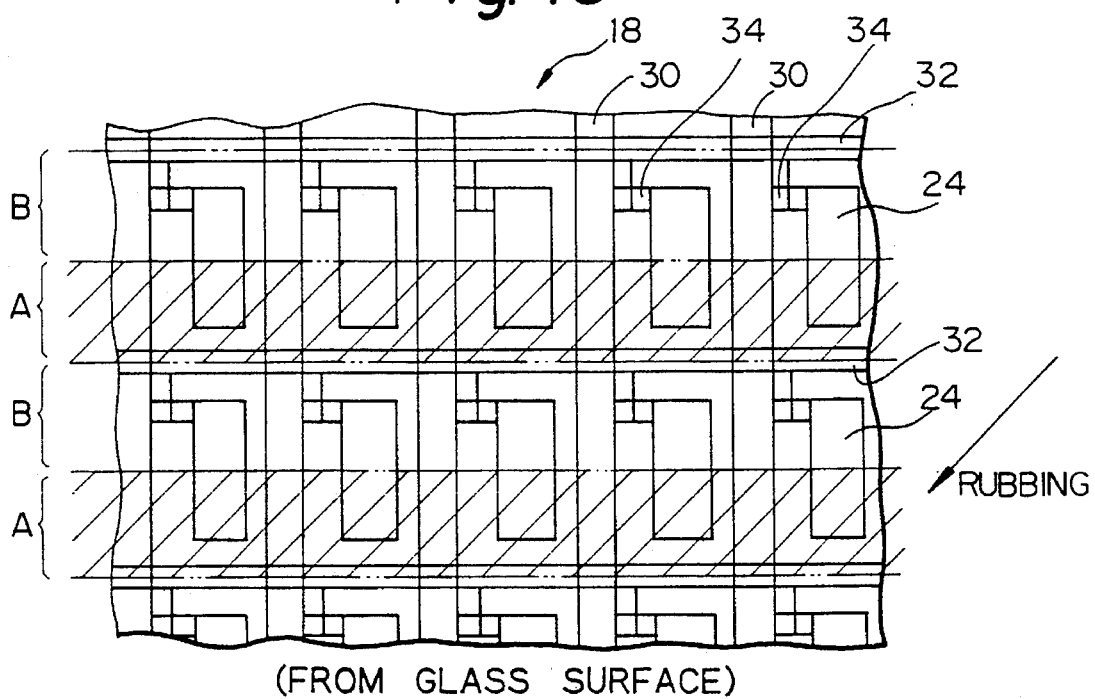
FIG. 15 is a plan view of the upper plate of FIG. 12.
Figure 16:
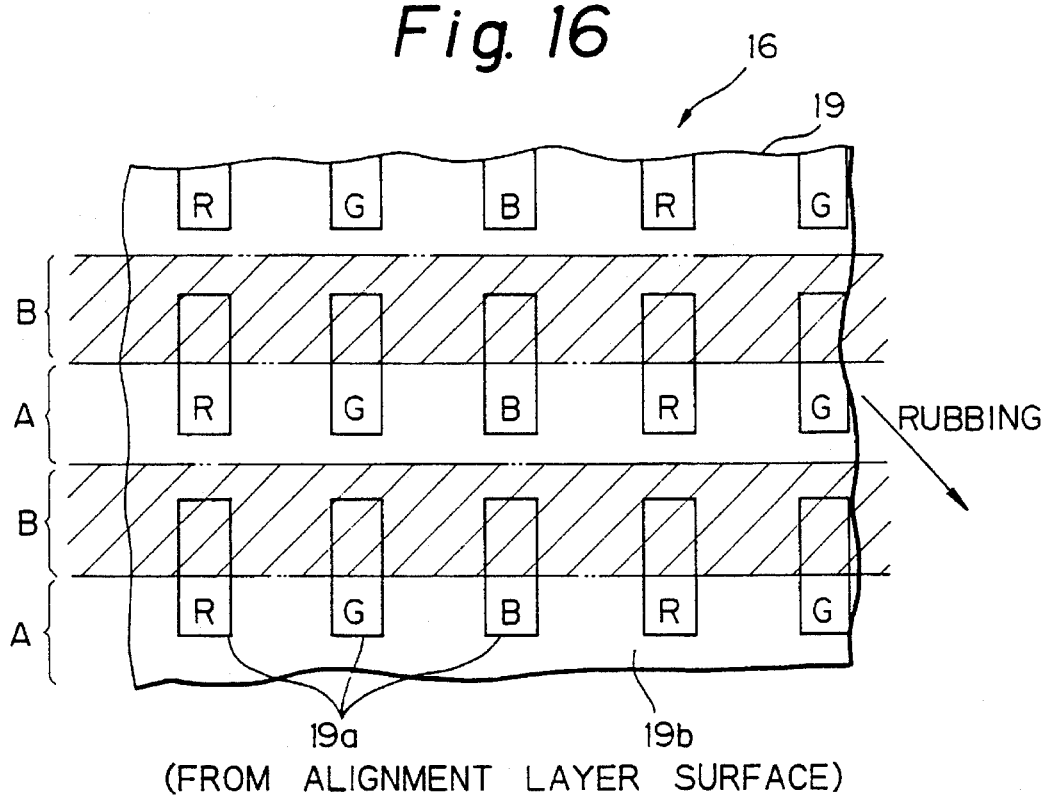
FIG. 16 is a plan view of the lower plate of FIG. 12.

FIGS. 15 and 16 show the different liquid crystal aligning domains A and B in greater detail. FIG. 15 shows the upper glass plate 18 comprising a plurality of pixel electrodes 24, the data and gate bus lines 30 and 32, and the thin filmed transistors (TFT) 34. FIG. 16 shows the lower glass plate 16 having the color filter 19 with color portions 19a (G, B, and R) arranged in register with pixel electrodes 24. The color portions 19a are enclosed by a black matrix 19b. The liquid crystal aligning domains A and B are subdivided by a boundary line extending on the substantial center line of each of the pixel electrodes 24. Also, the liquid crystal aligning domains A and B are subdivided by a boundary line extending on the gate bus line 30.

Figure 12:
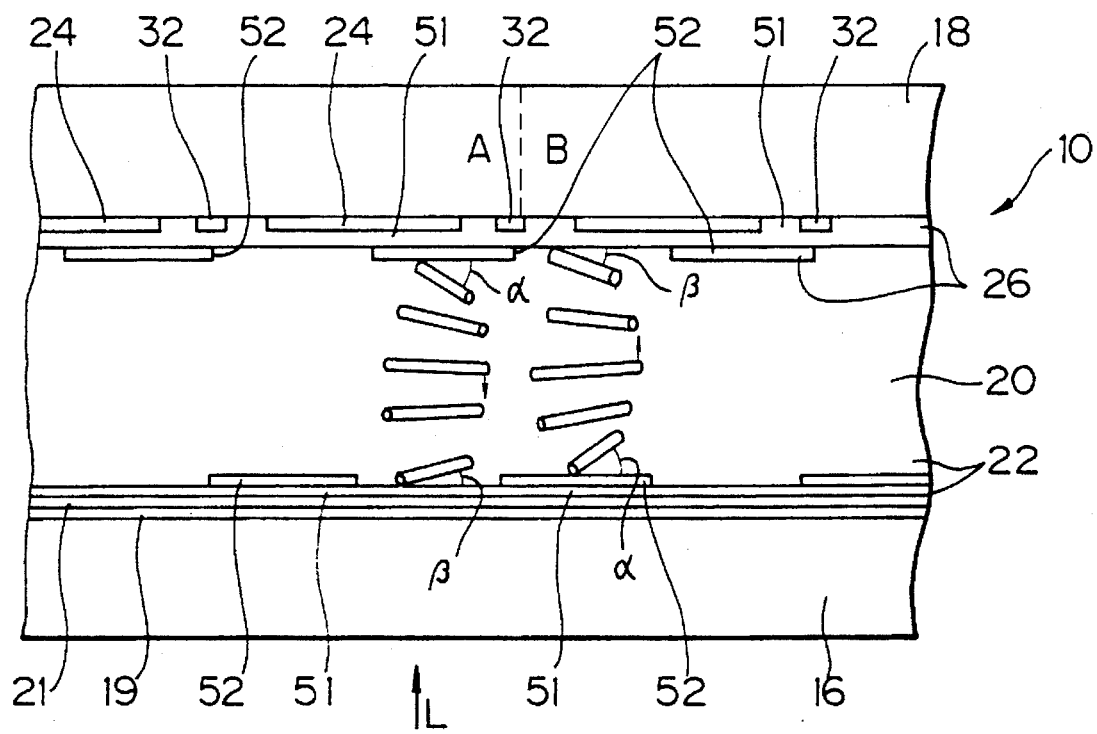
FIG. 12 is a cross-sectional view of a liquid crystal display device according to the third embodiment of the present invention.
Figure 13:
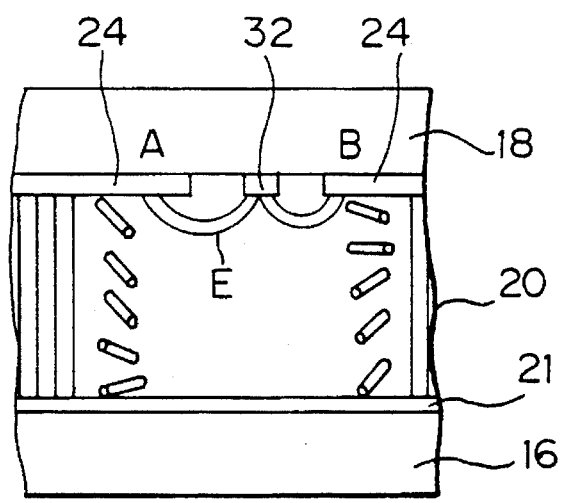
FIG. 13 is a view illustrating the effect of oblique electric force lines.
Figure 18:
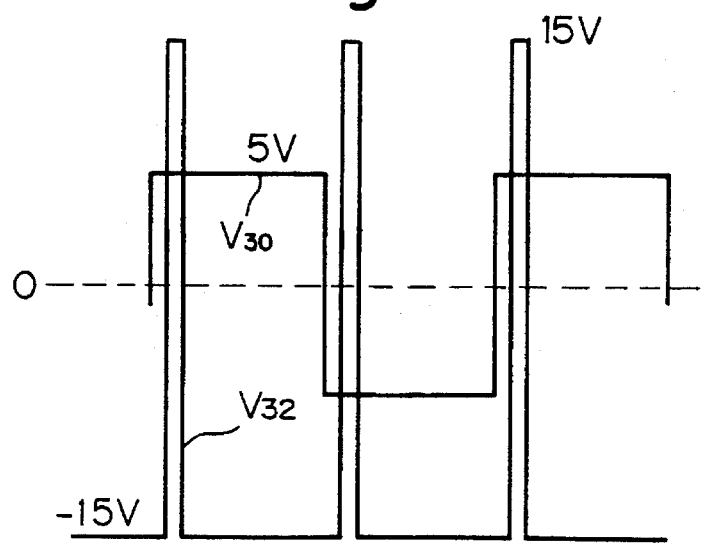
FIG. 18 is a view illustrating the voltages applied to the bus lines.

In addition, as shown in FIG. 12, the alignment layers 22 and 26 are arranged and treated so that molecules of the liquid crystal 20 near the upper alignment layer 26 in the liquid crystal aligning domain A rise toward the gate bus line 32. As shown in FIG. 18, the alternating voltage of ±5 V, represented by the curve $V_{30}$, is applied to the data bus line 30, and the base voltage of −15 V with the pulses, represented by the curve $V_{32}$, is applied to the gate bus line 32. Therefore, as shown in FIG. 13, a transverse electric field acts between the pixel electrode 24 and the gate bus line 32 and oblique lines of electric force E are formed.

Molecules of the liquid crystal 20 tend to rise along the electric field, and so, molecules of the liquid crystal 20 rise along the electric field between the common electrode 21 and the pixel electrode 24. Molecules of the liquid crystal 20 are also affected by the transverse electric field between the pixel electrode 24 and the gate bus line 32. Since the rubbing direction is arranged so that molecules of the liquid crystal 20 near the upper alignment layer 26 in the liquid crystal aligning domain A rise toward the gate bus line 32, the position of these molecules of the liquid crystal 20 coincide with the gradient of the oblique lines of electric force E. Accordingly, these molecules of the liquid crystal 20 can stably rise. In the liquid crystal aligning domain B, the rubbing direction is not arranged so that molecules of the liquid crystal 20 near the upper alignment layer 26 rise toward the gate bus line 32. But the intermediate molecules 20c tend to rise toward the gate bus line 32 by the rubbing direction of the lower glass plate. If the rubbing direction is reversed in the liquid crystal aligning domain A, molecules of the liquid crystal 20 may rise in reverse direction to the gate bus lines 32, and may rise without stability.

Figure 21:
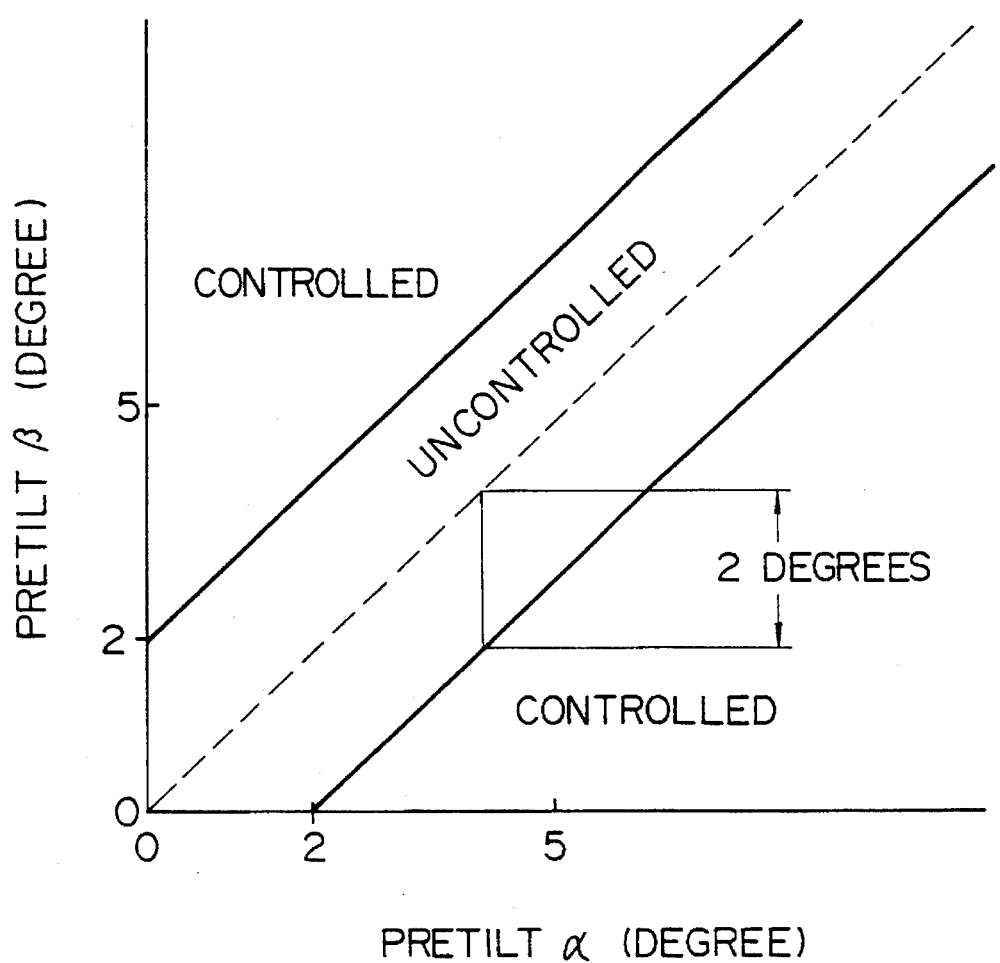
FIG. 21 is a graph of the controllable zones with respect to the pretilt.

The inventors further experimented regarding the preferable combination of the larger pretilt angle α and the smaller pretilt angle β and obtained results, as shown in FIG. 21. FIG. 21 shows that if the difference between the larger pretilt angle α and the smaller pretilt angle β is preferably larger than two degrees, it is possible to control the performance of molecules of the liquid crystal 20 in each of the liquid crystal aligning domains A and B.

Figure 10:
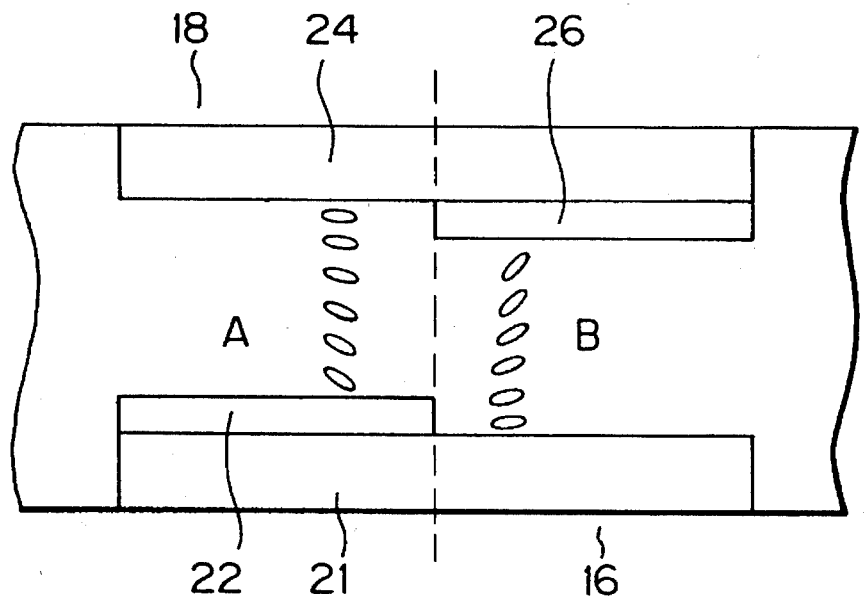
FIG. 10 is a view of a modification of the device of FIG. 9.

FIG. 10 shows a modification of the embodiment of FIGS. 9A and 12. In this embodiment, each of the upper and lower glass plates 18 and 16 has an alignment layer means comprising an alignment layer laminated on the respective electrode and an alignment layer constituted by the respective electrode itself. The alignment layer laminated on the respective electrode has openings corresponding with one of the liquid crystal aligning domains A and B. In the liquid crystal aligning domain A, the lower glass plate 16 has the alignment layer 22 and the revealed electrode 24 of the upper glass plate 18 faces the alignment layer 22 of the lower glass plate 16. In the liquid crystal aligning domain B, the upper glass plate 18 has the alignment layer 26 and the revealed electrode 21 of the lower glass plate 16 faces the alignment layer 26 of the upper glass plate 18.

Figure 22:
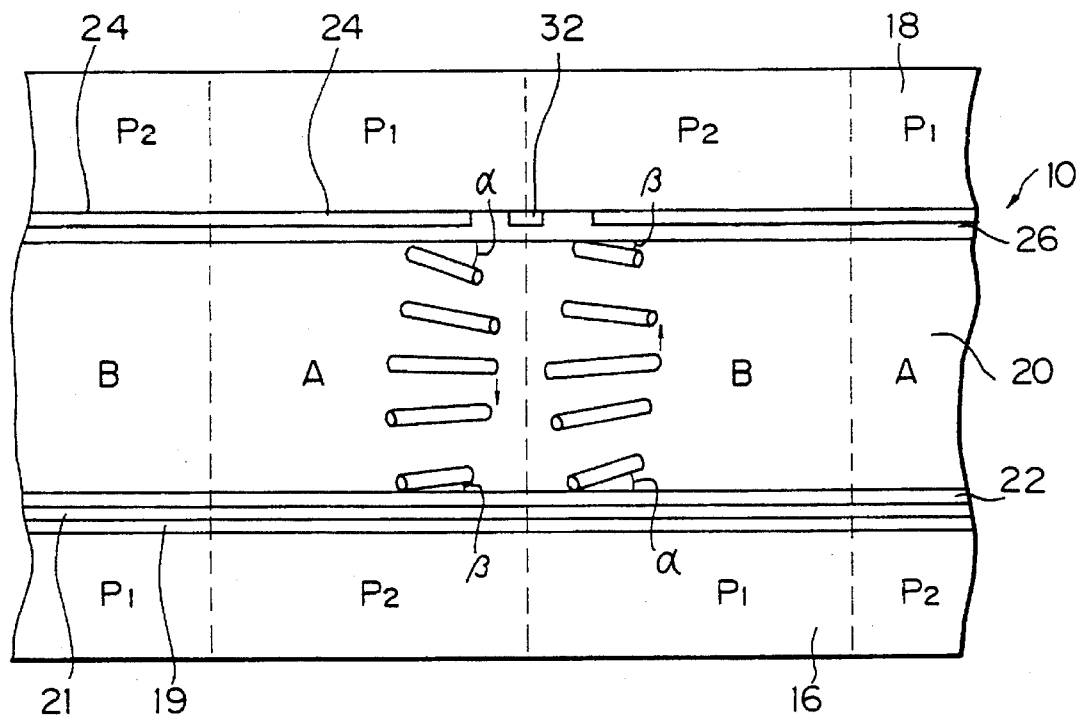
FIG. 22 is a cross-sectional view of a liquid crystal display device according to the fourth embodiment of the present invention.

FIG. 22 shows the fourth embodiment according to the present invention. This embodiment includes similar liquid crystal aligning domains A and B to those of FIG. 1. In each of the liquid crystal aligning domains A and B, molecules of the liquid crystal 20 near the respective glass plates 16 and 18 are aligned with different pretilt directions and different pretilt angles α and β. Each of the alignment layers 22 and 26 comprises a single alignment layer laminated on the lower structure, i.e., the respective glass plates 16 or 18 with an adhesive force. The extent of adhesion of the alignment layer 22 or 26 to the respective glass plates 16 or 18 varies for the liquid crystal aligning domains A and B for changing the pretilt angles α and β. In particular, in each of the liquid crystal aligning domains A and B, each of the alignment layer 22 and 26 has a region having a larger value $P_1$ of the adhesion to the respective glass plate 16 or 18 to provide the larger pretilt angle α and, a region having a smaller value $P_2$ of the adhesion to the respective glass plates 16 or 18 to provide the smaller pretilt angle β, and $P_1 > P_2$. In this case too, it is necessary to carry out a single rubbing operation for each of the alignment layers 22 and 26.

Figure 23A:
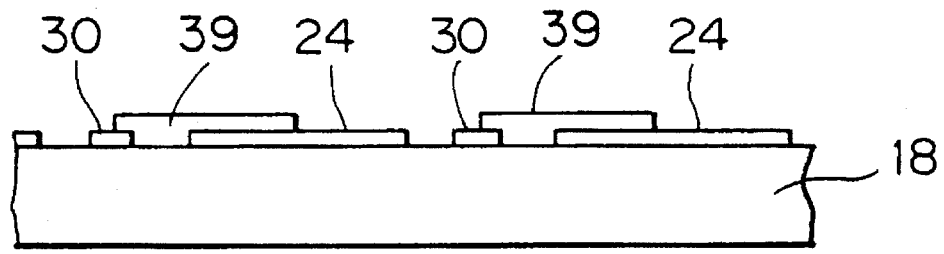
FIGS. 23A to 23C are views illustrating rubbing steps of the liquid crystal display device of FIG. 22.
Figure 23B:
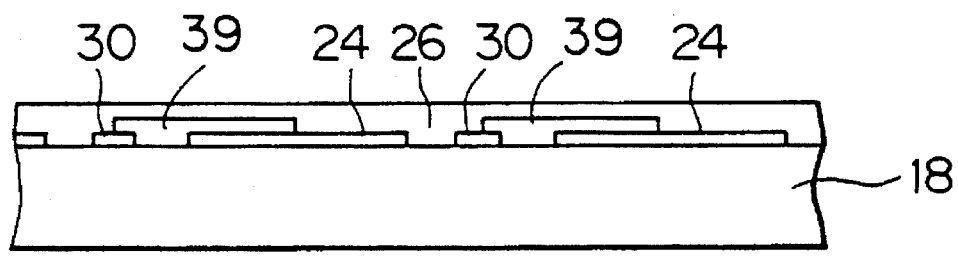
Figure 23C:
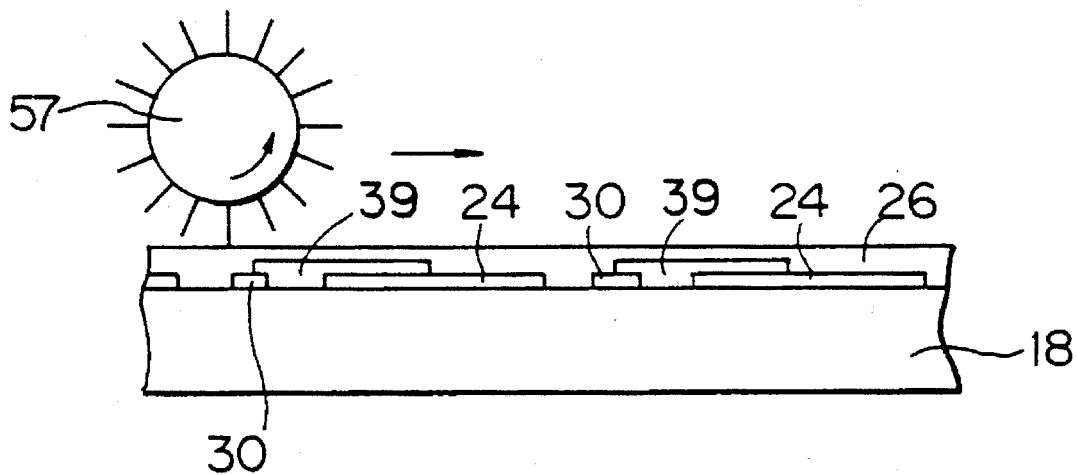

FIGS. 23A to 23C show the rubbing steps for obtaining the upper glass plate 18. The lower glass plate 16 can be similarly obtained. As show in FIG. 23A, an adhesion improving agent 39 such as a silane coupling agent is patterned on the upper glass plate 18 having the pixel electrode 24 so that the adhesion improving agent 39 has openings corresponding to one of the liquid crystal aligning domains A and B. The patterning can be carried out by a etching process comprising the steps of applying the adhesion improving agent 39 entirely on the upper glass plate 18, forming a mask of a resist, etching the adhesion improving agent 39, and removing the mask. Then, as shown in FIG. 23B, the alignment layer 26 is applied on the upper glass plate 18. Then, as shown in FIG. 23C, the rubbing is carried out using the rubbing roller 57.

The pretilt angle is measured in the liquid crystal display device having the thus obtained alignment layers 22 and 26, at a position where the silane coupling agent (SC) exists and a position where the silane coupling agent (SC) does not exist. Two samples of the alignment layers 22 and 26 are prepared, the first sample being JALS-219 and the second JALS-249. The results of the measurement of the pretilt angle (degree) is as follows.

|  | SAMPLE 1 | SAMPLE 2 |
| --- | --- | --- |
| SC(YES) | 4 | 7 |
| SC(NO) | 2 | 5 |

It has been found from the results that when the adhesion improving agent 39 such as a silane coupling agent is used, the alignment layer 22 or 26 closely adhered to the respective glass plate 16 or 18, and as a result, the pretilt angle becomes larger. Accordingly, it is possible to obtain the different liquid crystal aligning domains A and B by a single rubbing operation if the adhesion improving agent 39 is patterned on the lower structure to which the alignment layer 22 or 26 is laminated.

Figure 24A:
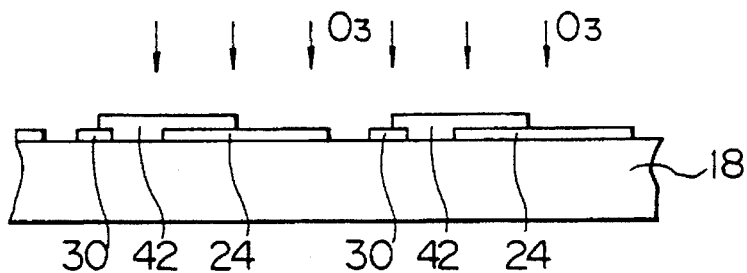
FIGS. 24A to 24D are views illustrating a modification of rubbing steps of the liquid crystal display device in which a pretilt is changed by changing the extent of the adhesion of the alignment layer.
Figure 24B:
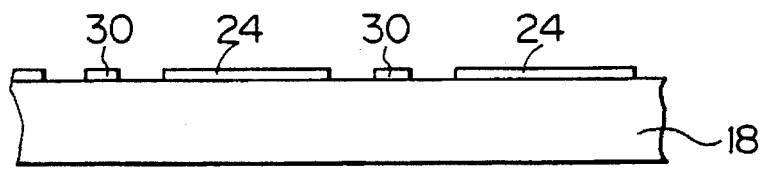
Figure 24C:
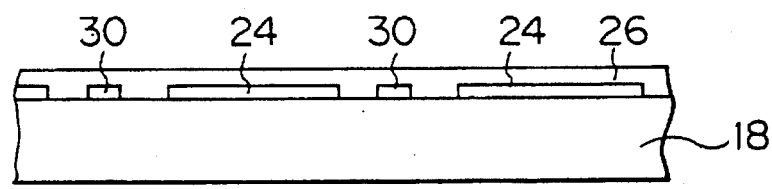
Figure 24D:
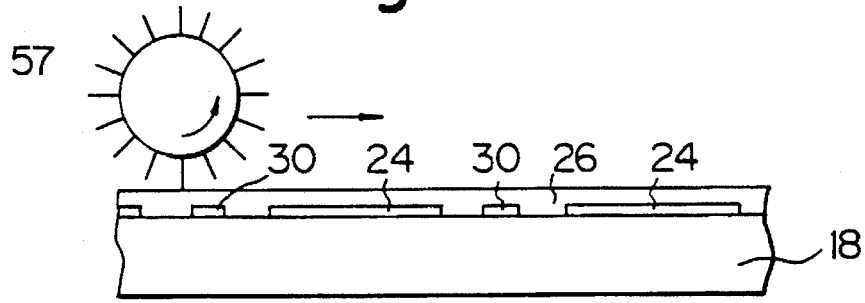

FIGS. 24A to 24D show modified rubbing steps using an ozone asher method as a means for varying the extent of adhesion of the alignment layers 22 and 26. As shown in FIG. 24A, a mask 42 of a resist is formed on the glass plate 18, and ozone is blown onto the glass plate 18. Then, as shown in FIG. 24B, the mask 42 is removed, with the result that only the portion where the mask did not exist is subjected to a surface treatment. Then, as shown in FIG. 24C, the alignment layer 26 is applied to the glass plate 18, and as shown in FIG. 24D, the rubbing is carried out using the rubbing roller 57.

The pretilt angle is measured in the liquid crystal display device having the thus obtained alignment layers 22 and 26, at a position where the extent of adhesion is enhanced by the ozone asher treatment (OA) and a position where the extent of adhesion is not changed because of no ozone asher treatment. Two samples of the alignment layers 22 and 26 are prepared, similar to the previous case. The result of the measurement of the pretilt angle (degree) is as follows.

|         | SAMPLE 1 | SAMPLE 2 |
|---------|----------|----------|
| OA(YES) | 5        | 8        |
| OA(NO)  | 2        | 5        |

It has been found from this result that the alignment layer 22 or 26 closely adhered to the respective glass plate 16 or 18 by the surface treatment such as an ozone asher treatment, and as a result, the pretilt angle becomes larger.

Figure 25:
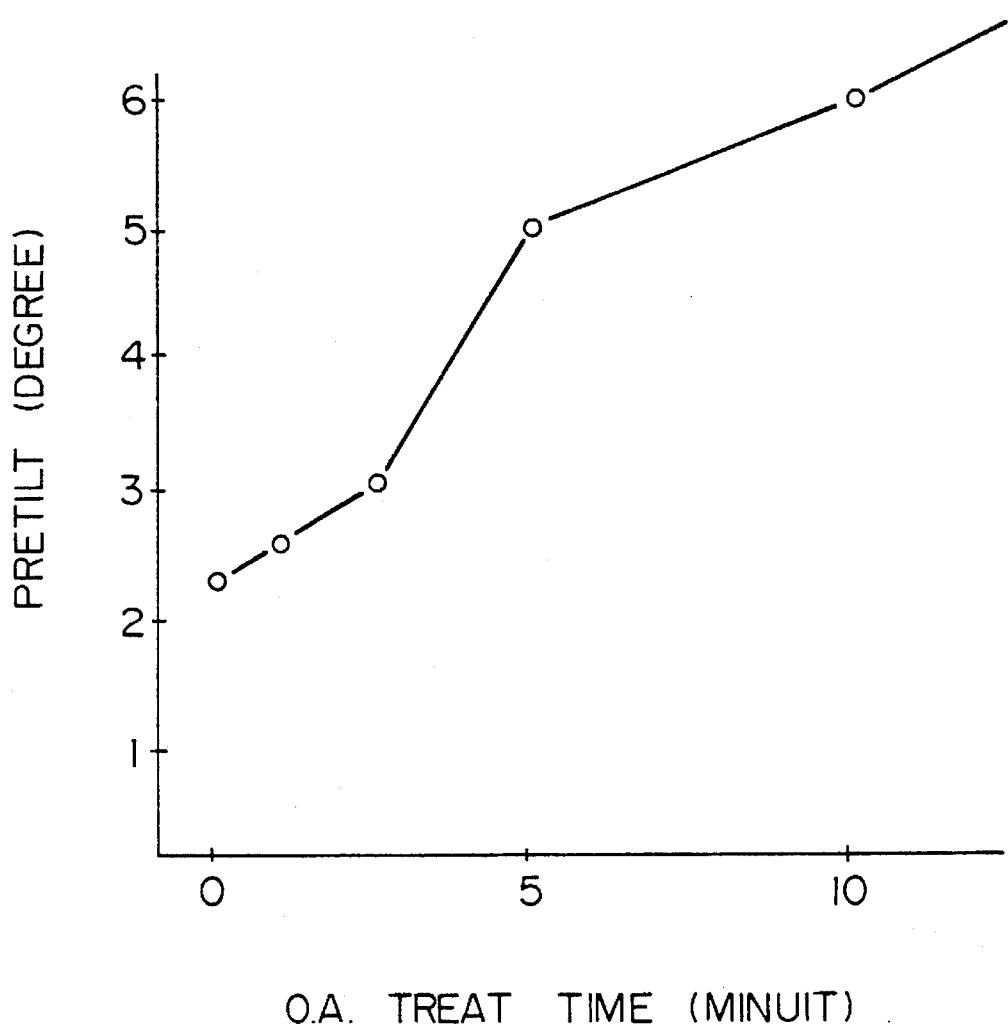
FIG. 25 is a graph of pretilt versus ozone asher treating time.

As shown in FIG. 25, there is a relationship between the ozone asher treatment time and the pretilt angle, and it is possible to realize a desired pretilt angle by adequately controlling the ozone asher treatment time. It will be understood that the surface treatment can be carried out by other treatments such as an oxygen plasma treatment.

Figure 26:
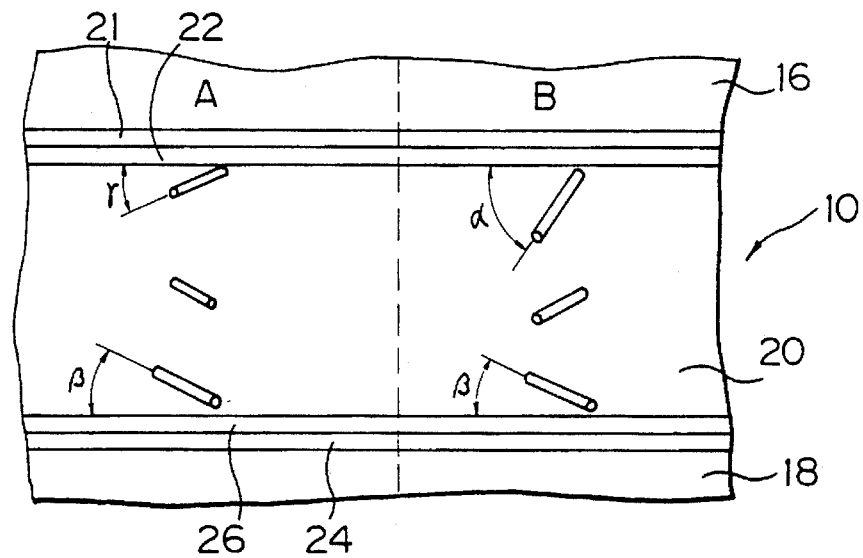
FIG. 26 is a cross-sectional view of a liquid crystal display device according to the fifth embodiment of the present invention.

FIG. 26 shows the fifth embodiment of the present invention. In this embodiment, the upper and lower glass plates are in reverse order to the previous embodiments. The upper alignment layer 22 is arranged and treated so that molecules of the liquid crystal 20 near the upper alignment layer 22 in the liquid crystal aligning domain B are aligned along the first line with the first pretilt direction and the first pretilt angle α (the largest) and molecules of the liquid crystal 20 near the upper alignment layer 22 in the liquid crystal aligning domain A are aligned along the first line with the first pretilt direction and a third pretilt angle γ, the third pretilt angle γ being smaller than the first pretilt angle α and smaller than the second pretilt angle β. The lower alignment layer 26 is arranged and treated so that molecules of the liquid crystal 20 near the lower alignment layer 26 both in the liquid crystal aligning domains A and B are aligned along the second line with the second pretilt direction and the second pretilt angle β.

In this case, intermediate molecules of the liquid crystal 20 between the upper and lower glass plates 16 and 18 in the liquid crystal aligning domain B rise depending on the pretilt angle α, and intermediate molecules of the liquid crystal 20 between the upper and lower glass plates 16 and 18 in the liquid crystal aligning domain A rise depending on the pretilt angle β.

Figure 28:
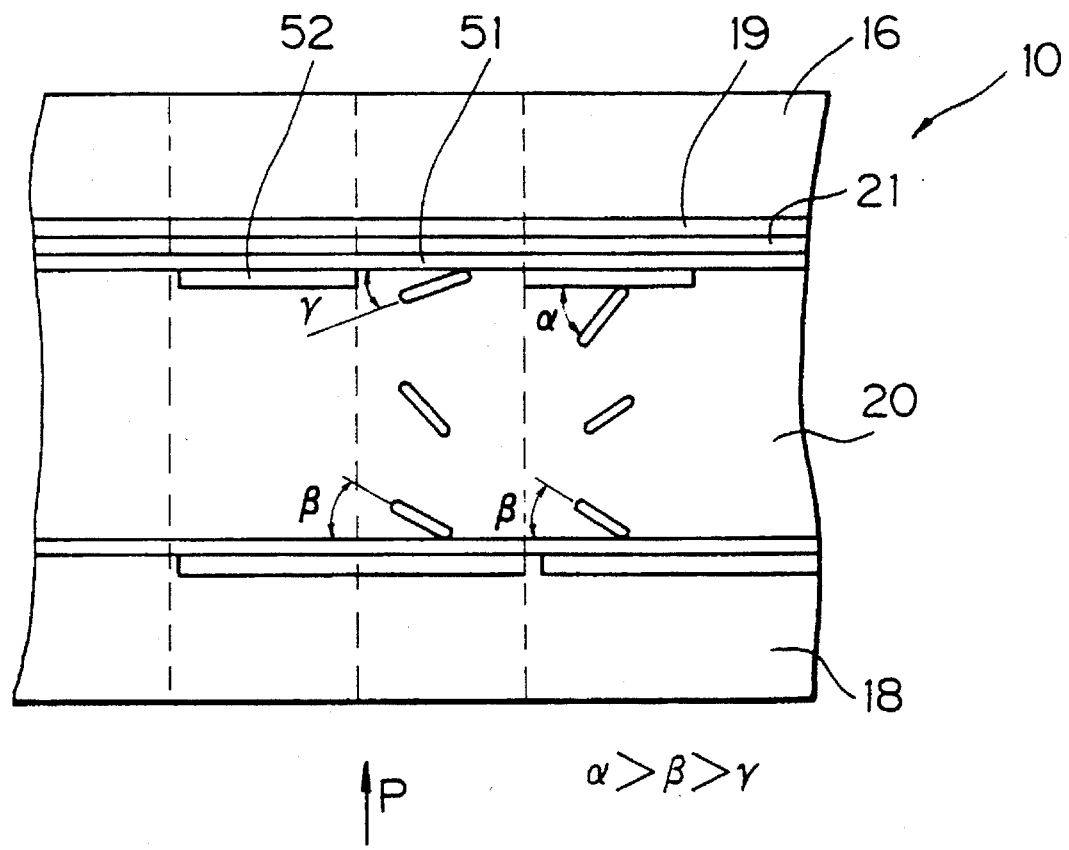
FIG. 28 is a detailed view of FIG. 26.
Figure 29:
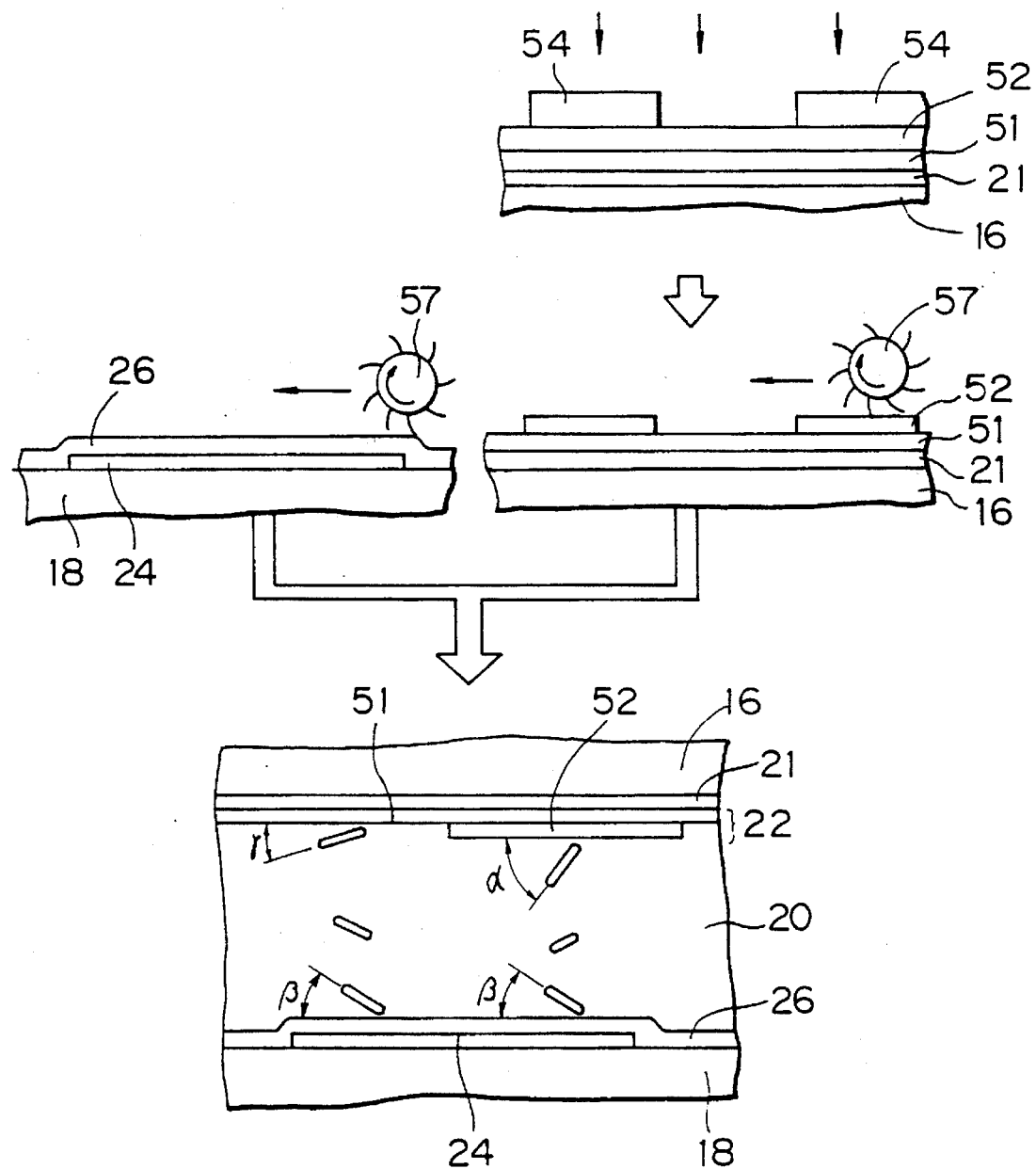
FIG. 29 is a view illustrating rubbing steps of the liquid crystal display device of FIG. 26.

FIG. 28 shows that the upper alignment layer 22 comprises a first alignment layer 51 and a second alignment layer 52, but the lower alignment layer 26 comprises a single alignment layer. Accordingly, it is possible to obtain the upper and lower alignment layers 22 and 26 by the rubbing process of FIG. 29. In FIG. 29, the lower glass plate 18 is prepared by applying the lower alignment layer 26 on the lower glass plate 18 after the pixel electrode 26 and the active matrix circuit are formed on the lower glass plate 18, and then rubbing the lower alignment layer 26 with the rubbing roller 57 in one direction. The upper glass plate 16 is prepared by applying the first and second alignment layers 51 and 52 on the upper glass plate 16 which has a color filter (not shown) and the common electrode 21, forming a mask 54 on the second alignment layer 52, etching the second alignment layer 52 by a photolithographic process, removing the mask 54, and then rubbing the upper alignment layer 22 with the rubbing roller 57 in another direction. Accordingly, it is possible to obtain the domain divided liquid crystal display device by a total of two rubbing operations and one photolithographic operation, which reduces the manufacturing costs and ensures high quality.

Preferably, the alignment layer 22 comprising the first and second alignment layers 51 and 52 is arranged on the upper glass plate 16 having the color filter and the common electrode 21, and the single alignment layer 26 is arranged on the lower glass plate 18 having the pixel electrode 24 and the active matrix circuit, because the manufacturing steps are averaged between the upper and lower glass plates 16 and 18. Also, when the first alignment layer is made from an inorganic material that has a lower electric resistance than that of an organic material and is chemically unstable, and when the alignment layer 26 on the lower glass plate 18 having the pixel electrode 24 and the active matrix circuit comprises the first and second alignment layers 51 and 52, a leak current may flow between the alignment layer 26 and the pixel electrode 24 or bus lines 30 or 32 and the alignment layer 26 may become charged so as to apply voltage to the liquid crystal 20 irrespective of the voltage level of the pixel electrode 24, thereby causing an undesirable display. There is no high voltage portion in the upper glass plate 16 having the color filter (not shown) and the common electrode 21, and such a problem does not occur.

Figure 27:
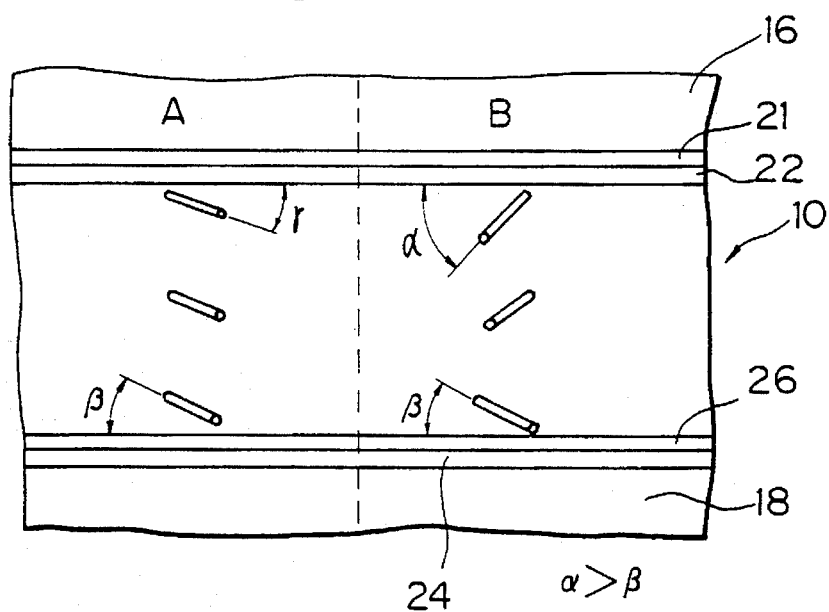
FIG. 27 is a cross-sectional view of a liquid crystal display device according to the sixth embodiment of the present invention.

FIG. 27 shows the sixth embodiment of the present invention. In this embodiment, the upper alignment layer 22 is arranged and treated so that molecules of the liquid crystal 20 near the upper alignment layer 22 in the liquid crystal aligning domain B are aligned along the first line with the first pretilt direction and the first pretilt angle α and molecules of the liquid crystal 20 near the upper alignment layer 22 in the liquid crystal aligning domain A are aligned along the first line with the second pretilt direction and a third pretilt angle γ. The lower alignment layer 26 is arranged and treated so that molecules of the liquid crystal 20 near the lower alignment layer 26 both in the liquid crystal aligning domains A and B are aligned along the second line with the second pretilt direction and the second pretilt angle γ.

In this case, intermediate molecules of the liquid crystal 20 between the upper and lower glass plates 16 and 18 in the liquid crystal aligning domain B rise depending on the pretilt angle α, and intermediate molecules of the liquid crystal 20 between the upper and lower glass plates 16 and 18 in the liquid crystal aligning domain A rise depending on the pretilt direction of the molecules of the liquid crystal 20 near the upper and lower glass plates 16 and 18, and the third pretilt angel γ can be selected as desired.

Figure 30:
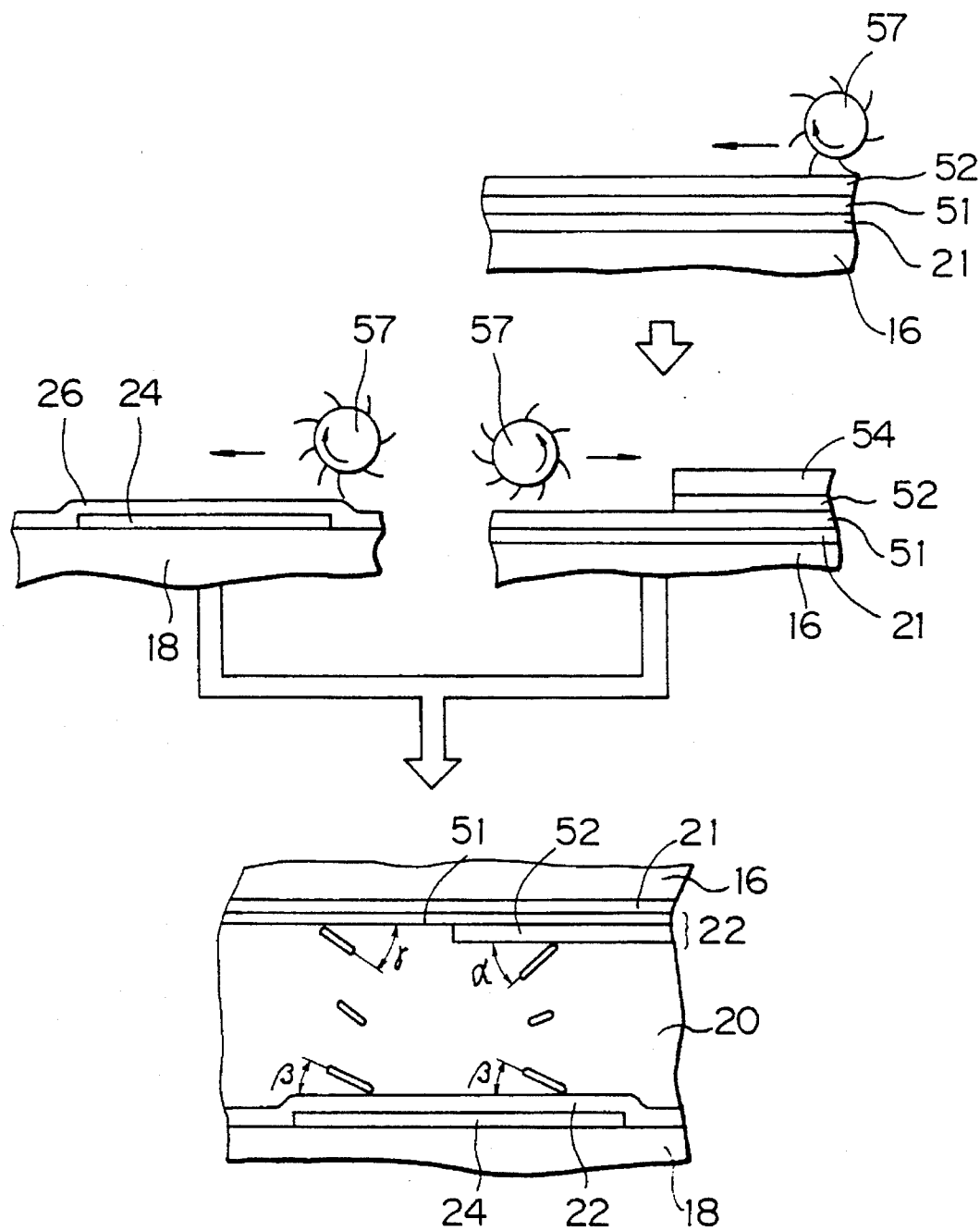
FIG. 30 is a view illustrating rubbing steps of the liquid crystal display device of FIG. 27.

FIG. 30 shows the rubbing steps of the liquid crystal display device of FIG. 27. The lower glass plate 18 is prepared by applying the lower alignment layer 26 on the lower glass plate 18 after the pixel electrode 26 and the active matrix circuit are formed on the lower glass plate 18, and then rubbing the lower alignment layer 26 with the rubbing roller 57 in one direction. The upper glass plate 16 is prepared by applying the first and second alignment layers 51 and 52 on the upper glass plate 16 having the common electrode 21, rubbing the second alignment layer 52 with the rubbing roller 57 in one direction, forming a mask 54 on the second alignment layer 52, etching the second alignment layer 52 by a photolithographic process, rubbing the first alignment layer 51 with the rubbing roller 57 in another direction, and removing the mask 54.

Figure 19:
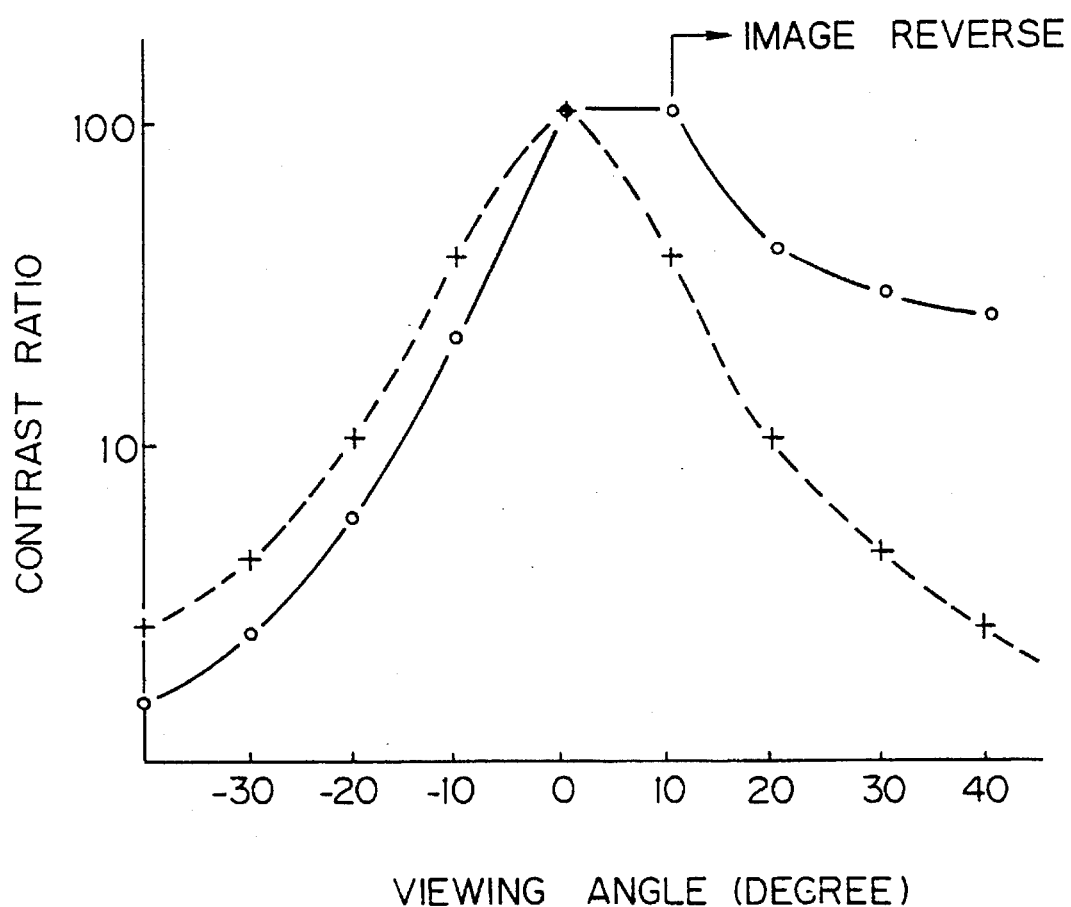
FIG. 19 is a graph of the contrast ratio versus the viewing angle established in the normally white mode.

FIG. 19 shows the contrast ratio versus the viewing angle in the normally white mode. The curve plotting the circular marks is the contrast ratio of the prior art liquid crystal device having a uniformly aligned liquid crystal, and the curve plotting the "x" marks is the contrast ratio of the domain divided liquid crystal device according to the present invention. It is possible to improve the contrast ratio in a wide range of viewing angles.

Figure 20:
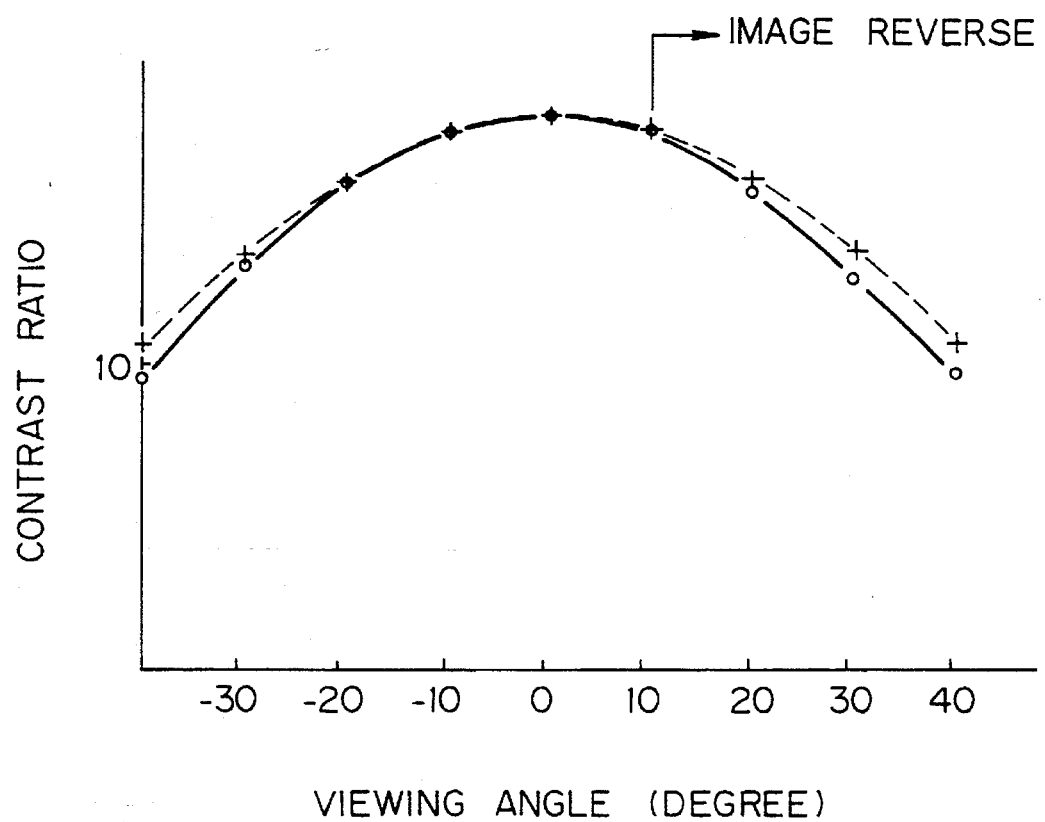
FIG. 20 is a graph of the contrast ratio versus the viewing angle established in the normally black mode.

FIG. 20 shows the contrast ratio versus the viewing angle in the normally black mode. The curve plotting the circular marks is the contrast ratio of the prior art liquid crystal device having a uniformly aligned liquid crystal, and the curve plotting the "x" marks is the contrast ratio of the domain divided liquid crystal device according to the present invention. It is also possible to improve the contrast ratio in a wide range of viewing angles.

Figure 31:
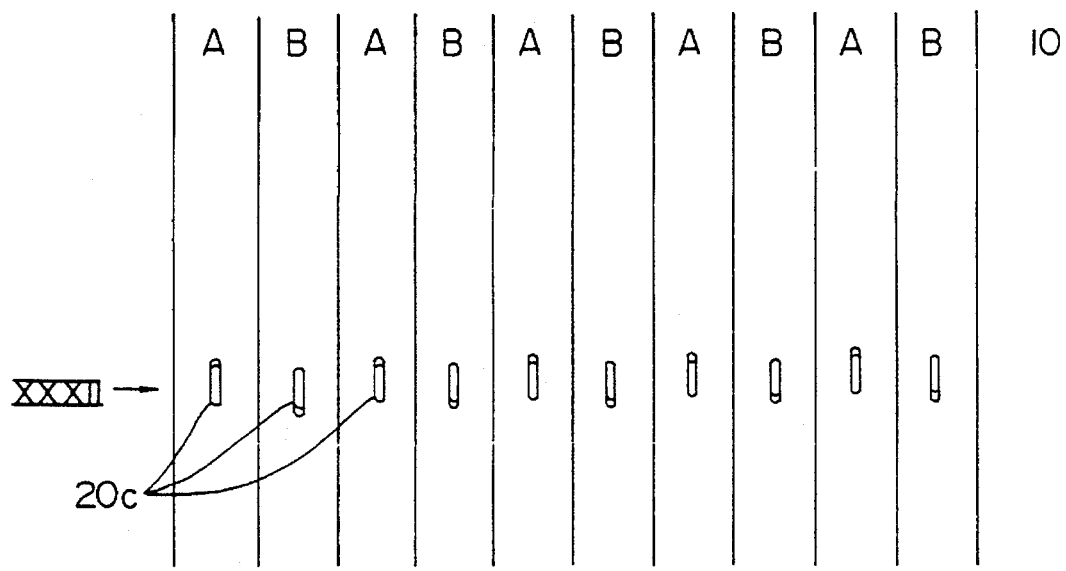
FIG. 31 is a diagrammatic view illustrating an arrangement of liquid crystal aligning domains according to the seventh embodiment of the present invention.

In the domain divided liquid crystal display device, molecules of the liquid crystal 20 in the liquid crystal aligning domain A are aligned in reverse order to molecules of the liquid crystal 20 in the liquid crystal aligning domain B, and there is a problem that the alignment of molecules of the liquid crystal 20 located on the boundary between the liquid crystal aligning domain A and B tends to become unstable. FIG. 31 shows the seventh embodiment of the present invention, which strives to solve this problem.

In FIG. 31, the liquid crystal aligning domains A and B are formed in an elongated strip-like shape so that molecules of the liquid crystal 20 located intermediately between the upper and lower glass plates 16 and 18 in the liquid crystal aligning domains A and B extend parallel to the elongated strip-like shape. That is, molecules of the liquid crystal 20 located intermediately between the upper and lower glass plates 16 and 18 in the liquid crystal aligning domains A and B extend in a plane parallel to the lines separating the liquid crystal aligning domains A and B and perpendicular to the sheet of FIG. 31. The liquid crystal aligning domains A and B are preferably subdivided by a boundary line extending parallel to the bus lines 30 or 32.

Figure 32:
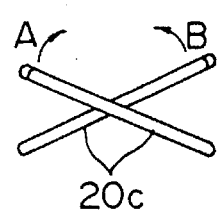
FIG. 32 is a diagrammatic side view of molecules of the liquid crystal of FIG. 31, viewed from the arrow XXXII in FIG. 31.
Figure 33:
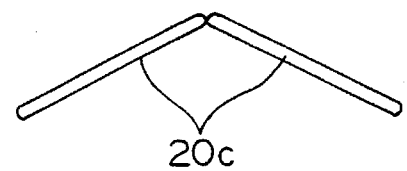
FIG. 33 is a diagrammatic side view of molecules of the liquid crystal in another arrangement.

As shown in FIG. 32, molecules of the liquid crystal 20 located intermediately between the upper and lower glass plates 16 and 18 in the liquid crystal aligning domains A and B extend in an X-shape, when viewed from the side of the intermediate molecules, that is, from the arrow XXXII in FIG. 31. The intermediate molecules at the boundary of the liquid crystal aligning domains A and B must rise in opposite directions, as represented by the arrows A and B in FIG. 32, when the voltage is applied. In contrast, FIG. 33 shows that intermediate molecules in the liquid crystal aligning domains A and B extend in an inverted V-shape with the edges thereof abutting each other. Such case may be obtained when the intermediate molecules in the liquid crystal aligning domains A and B extend in a plane perpendicular to the lines separating the liquid crystal aligning domains A and B and perpendicular to the sheet of FIG. 31.

Molecules of the liquid crystal 20 interact to prevent change in the position thereof. It is necessary to apply a sufficient force to overcome the interacting force. The arrangement of FIG. 32 is a structure having an elasticity of twist coefficient to deform the intermediate molecules at the boundary of the liquid crystal aligning domains A and B. The arrangement of FIG. 33 is a structure having an elasticity of bend coefficient to deform the intermediate molecules at the boundary of the liquid crystal aligning domains A and B. It is known that the elasticity of twist coefficient is generally smaller than the elasticity of bend coefficient to deform the molecules. Accordingly, the intermediate molecules at the boundary of the liquid crystal aligning domains A and B of FIG. 31 can be deformed with less energy than that of the other arrangements, and can be well aligned at the boundary of the liquid crystal aligning domains A and B.

Figure 34:
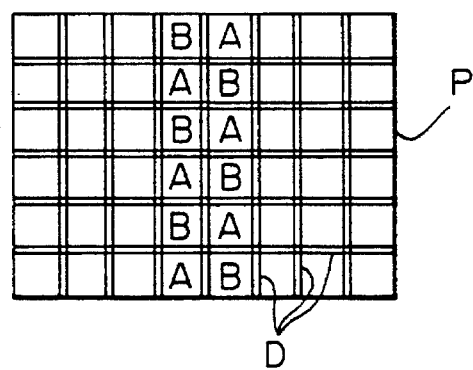
FIG. 34 is a diagrammatic view illustrating a disclination in the display.

In addition, in the domain divided liquid crystal display device, there is a problem of disclination arising at the boundary between the liquid crystal aligning domain A and B. FIG. 34 shows the disclination D at the boundary between the liquid crystal aligning domain A and B in a liquid display panel. The disclination D appears as bright stripes in the normally white mode of the twisted nematic liquid crystal display device, although such bright stripes cannot be seen directly but will deteriorate the contrast ratio.

Figure 35:
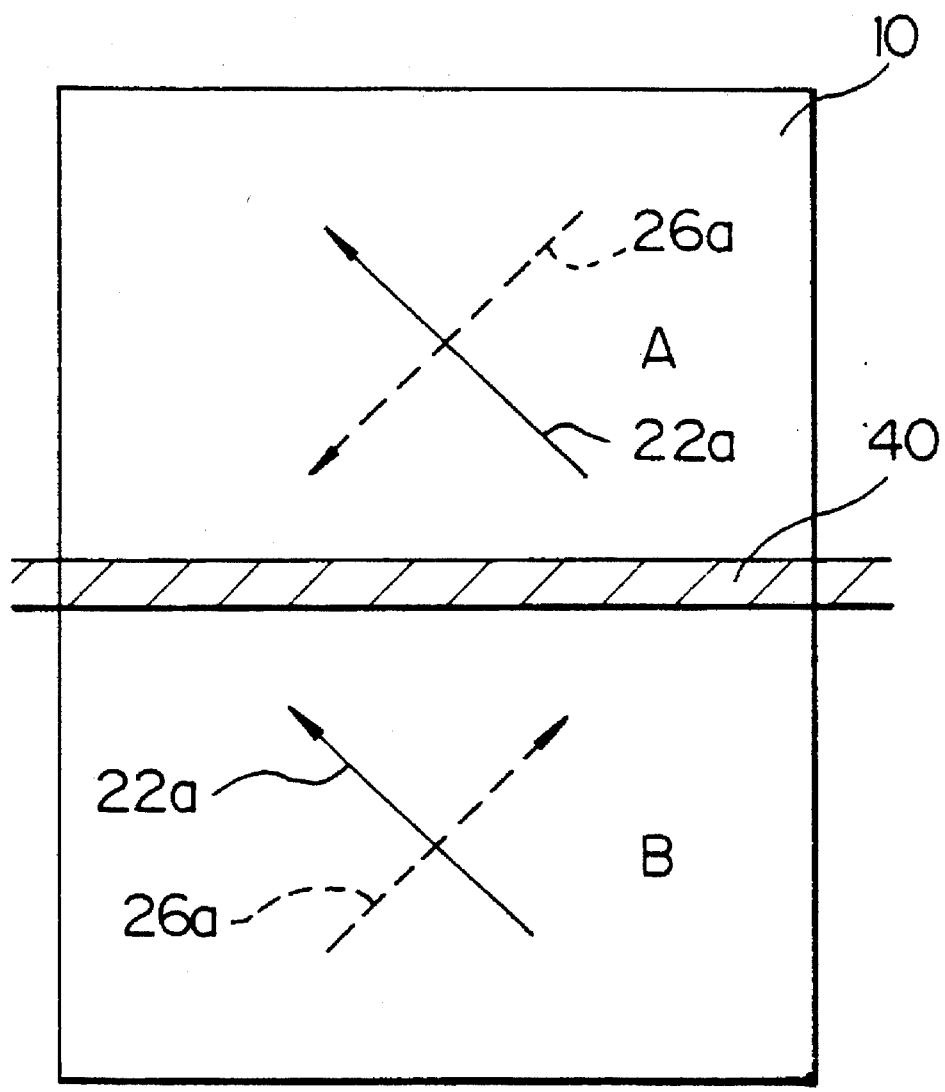
FIG. 35 is a diagrammatic plan view of one unit area of a liquid crystal display device according to the eighth embodiment of the present invention, including a shading layer.

FIG. 35 shows the eighth embodiment of the present invention which strives to solve the disclination. In this embodiment, a shading layer 40 is arranged along the boundary line between the liquid crystal aligning domains A and B. This shading layer 40 covers the disclination D of FIG. 34, and mitigates the reduction of the contrast brightness and darkness ratio. The shading layer 40 has a sufficient width of up to 10 microns because the width of disclination is less than 5 microns. Accordingly, it is possible to provide a clear display.

Figure 36:
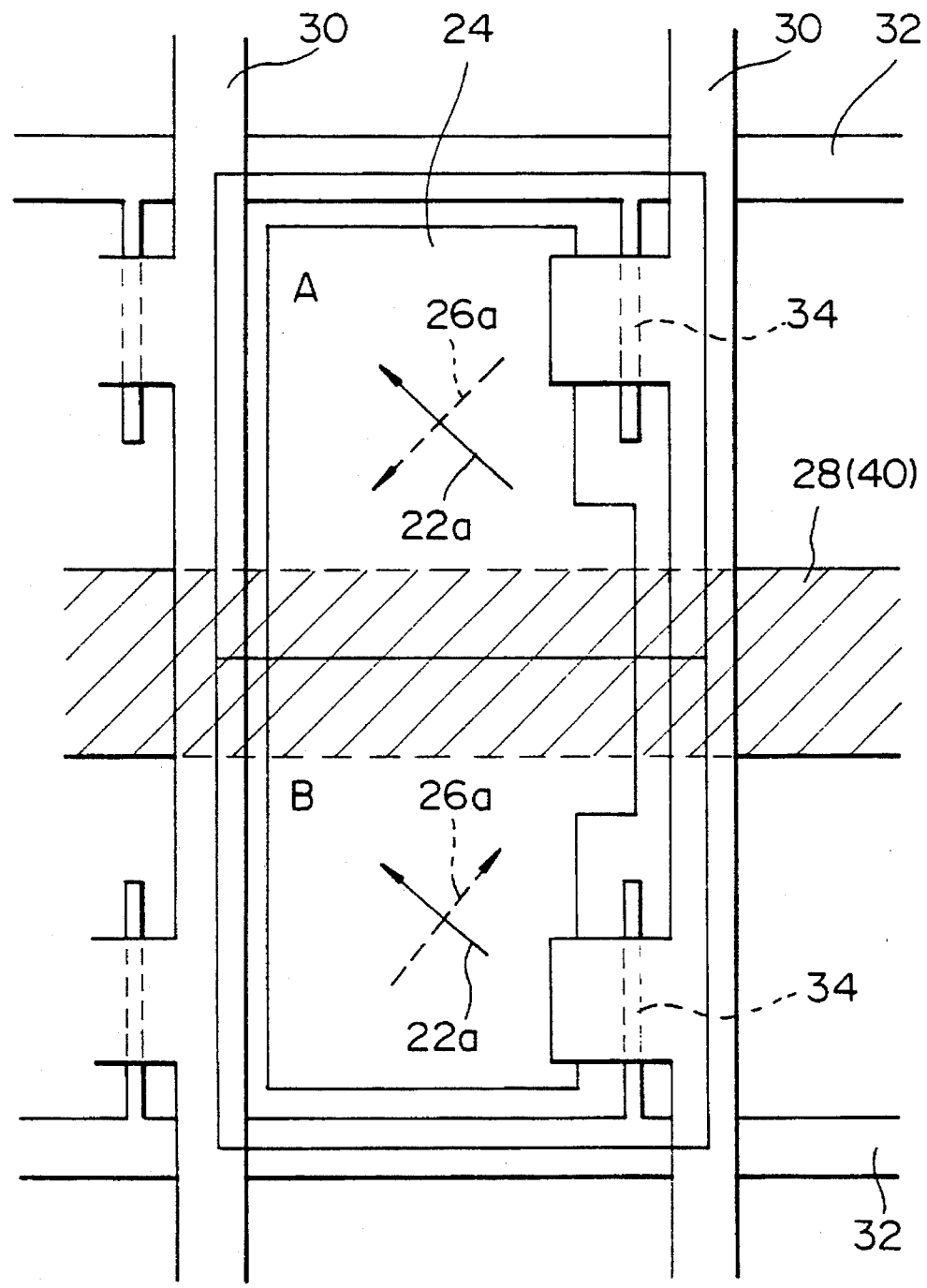
FIG. 36 is a detailed view of FIG. 35.

FIG. 36 shows a detailed example of the shading layer 40. The liquid crystal aligning domains A and B are formed in the unit of the pixel electrode 24 surrounded by the data bus lines 30 and the gate bus lines 32, and the storage capacitance electrode 28 extends along the boundary between the liquid crystal aligning domains A and B, the storage capacitance electrode 28 also functions as the shading layer 40. Two transistors 34 are arranged in a redundant arrangement for each of the pixel electrode 24 in symmetrical positions regarding the center line of the pixel electrode 24.

As shown in FIG. 3, the storage capacitance electrode 28 is provided on the upper glass plate 18 in an overlapping relationship with the pixel electrode 24 via an insulating layer. The storage capacitance electrode 28 is made from a conductive and opaque material such as aluminum or titanium. It is advisable to make the storage capacitance electrode 28 from the same material as the gate bus line 32 and simultaneously with the gate bus line 32. Accordingly, it is possible to make the shading layer 40 in this example.

Figure 37:
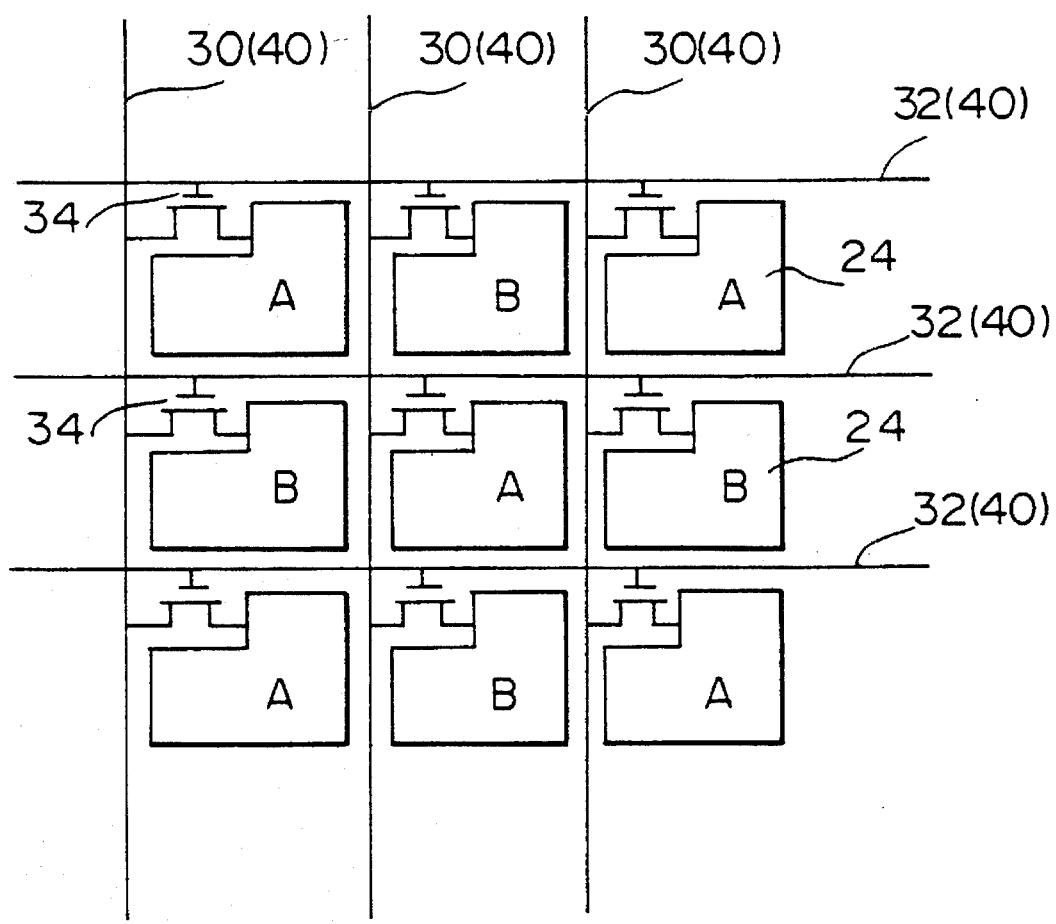
FIG. 37 is a diagrammatic plan view illustrating another example of a shading layer.

FIG. 37 shows another example of the shading layer 40. In this example, each of the liquid crystal aligning domains A and B is formed in the unit of the pixel electrode 24 surrounded by the data bus lines 30 and the gate bus lines 32. The data bus lines 30 and the gate bus lines 32 are formed in an overlapping relationship with the boundary between the liquid crystal aligning domains A and B and constituting the shading layer 40. Similar to this example, it is also possible to use at least a part of the data bus lines 30 and the gate bus lines 32 as the shading layer 40, by adequately determining the disposition of the liquid crystal aligning domains A and B relative to the data bus lines 30 and the gate bus lines 32.

Figure 38:
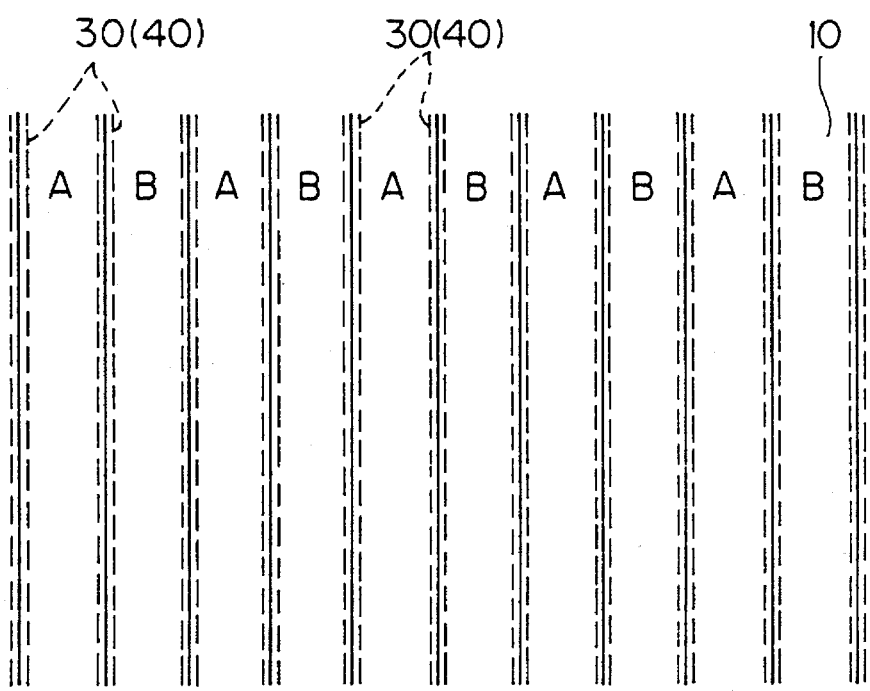
FIG. 38 is a diagrammatic plan view illustrating still another example of a shading layer.

FIG. 38 shows another example of the shading layer 40. In this example, the liquid crystal aligning domains A and B are formed in an elongated strip-like shape, as shown in FIG. 31. The data bus lines 30 are formed in an overlapping relationship with the boundary between the liquid crystal aligning domains A and B and constituting the shading layer 40.

Figure 39:
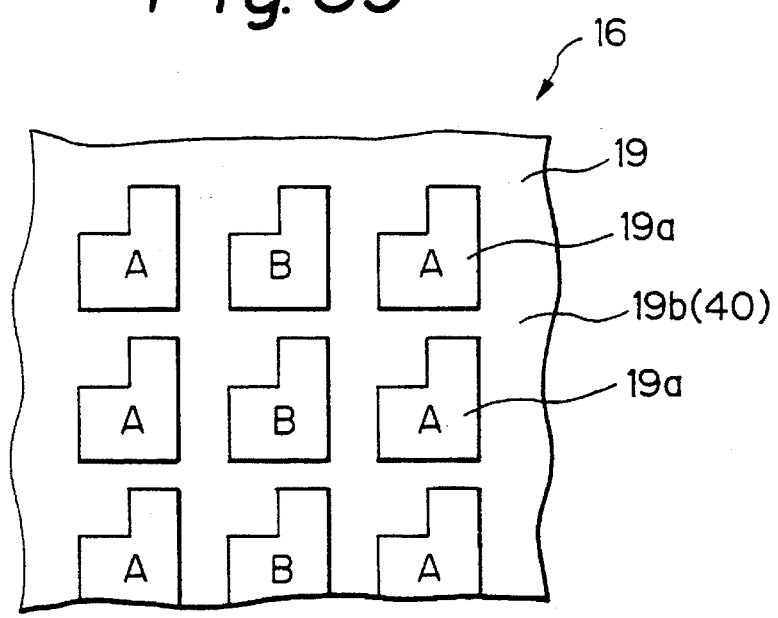
FIG. 39 is a diagrammatic plan view illustrating still another example of a shading layer.

FIG. 39 shows another example of the shading layer 40. In this example, the shading layer 40 is formed on the lower glass plate 16. The lower glass plate 16 has a color filter 19 with color portions 19a (R, G, and B), and a black matrix 19b surrounding the color portions 19a. The shading layer 40 corresponds to a portion of the black matrix 19b extending between the liquid crystal aligning domains A and B.

Figure 40:
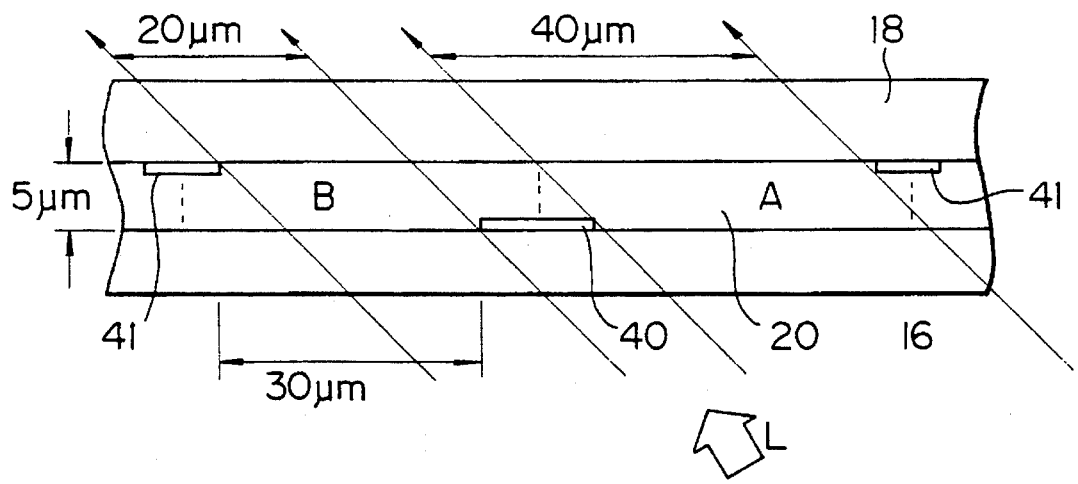
FIG. 40 is a diagrammatic cross-sectional view illustrating still another example of a shading layer.

FIG. 40 shows another example of the shading layer 40. In this example, first parallel shading layers 40 are formed on the lower glass plate 16 at a predetermined pitch and second parallel shading layers 41 are formed on the upper glass plate 18 at a predetermined pitch. The second shading layers 41 are shifted from the respective first shading layers 40. In the example, the thickness of the liquid crystal 20 is 5 microns, the gap between the shading layers 40 and 42 is 30 microns.

Figure 41:
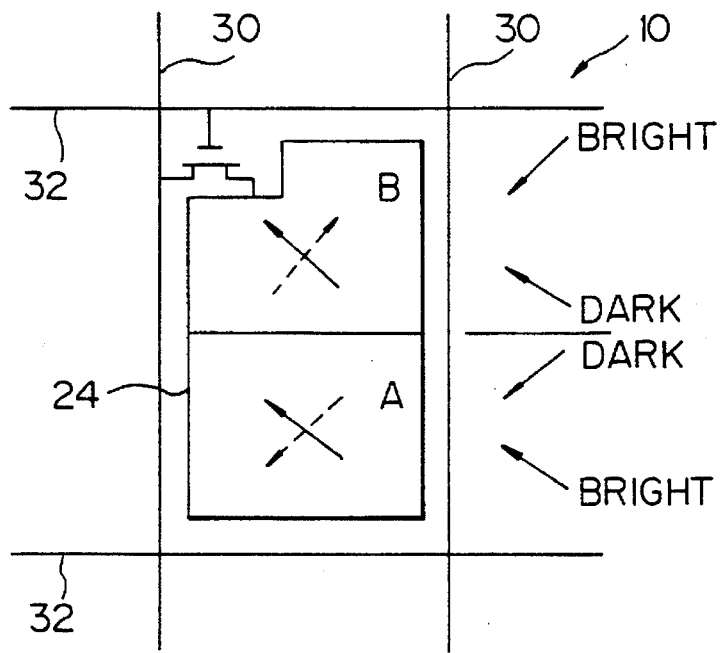
FIG. 41 is a diagrammatic plan view of the different liquid crystal aligning domains of FIG. 40.

FIG. 41 shows the liquid crystal aligning domains A and B having bright viewing angles and the dark viewing angles. The arrows in FIG. 41 correspond to the directions of the arrows L, U and C in FIG. 6A. As will be apparent from the foregoing description, in the liquid crystal aligning domains A, the lower viewing angle provides a characteristic of the curve L of FIG. 6B in which the display is bright, and the upper viewing angle provides a characteristic of the curve U in which the display is dark. The liquid crystal aligning domain B has a reverse characteristic and the domain divided liquid crystal display device realizes the average brightness of the curve I.

The curve I of FIG. 6B approaches the curve C more than the curves L and U, but still has a higher transmittance than the curve C. Therefore, the display is whitish when viewed from below or from above. The shading layers 40 and 41 of FIG. 40 cannot only cover the disclination but also serve to improve the contrast ratio of the liquid crystal display device of FIG. 41.

In FIG. 40, supposing the light is incident from below in the direction of the arrow L and the operator views the display from above, the display of the liquid crystal aligning domains A seems dark and the display of the liquid crystal aligning domains B seems bright. An aperture of the liquid crystal aligning domains A having a dark characteristic is defined between the shading layers 40 and 41; the aperture being widened to 40 microns, which is larger than the normal gap of 30 microns. Conversely, an aperture of the liquid crystal aligning domains B having the bright characteristic is defined between the shading layers 40 and 41, the aperture being narrowed to 20 microns, which is smaller than the normal gap of 30 microns. The average of the characteristics of the curves L and U is compensated by the dark side and improves the whitish display. It is possible to use the storage capacitance electrode 28 and bus lines for the shading layer 40, and the black matrix for the shading layer 41.

Figure 42:
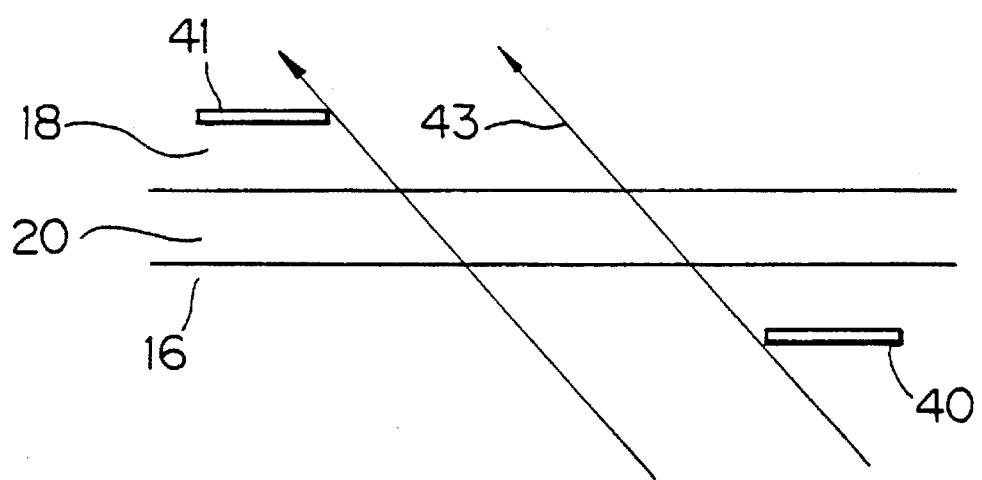
FIG. 42 is a view of a modification of FIG. 40.

FIG. 42 shows that the shading layers 40 and 41 can be arranged at positions spaced from the inner surface of the glass plates 16 and 18 to optionally determine an oblique aperture 43 between the shading layers 40 and 41.

Figure 43:
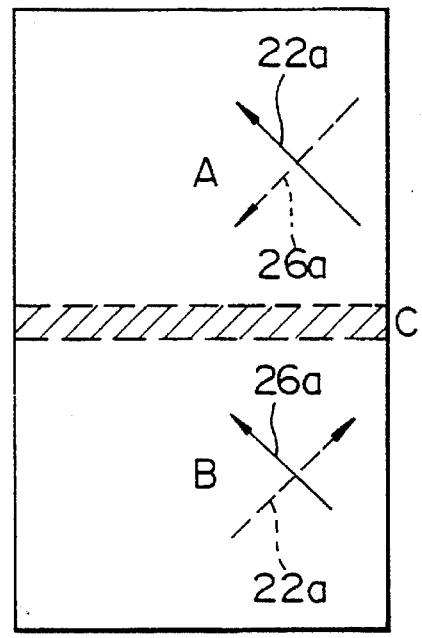
FIG. 43 is a diagrammatic plan view of one unit area of a liquid crystal display device according to the ninth embodiment of the present invention.
Figure 44:
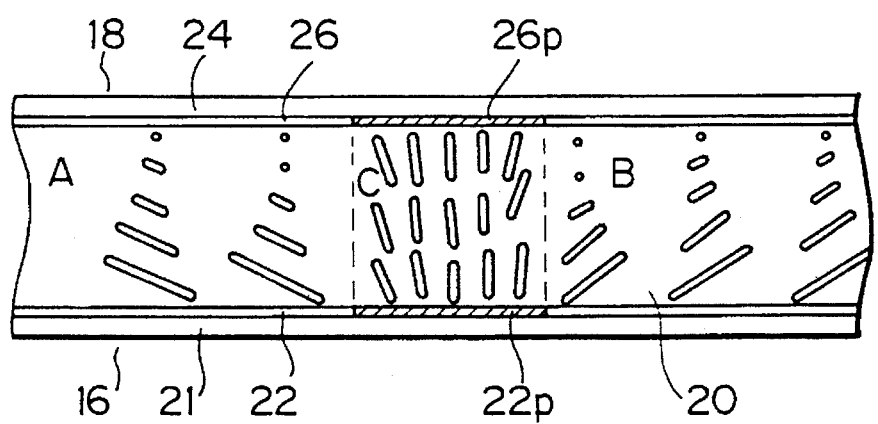
FIG. 44 is a cross-sectional view of FIG. 43.
Figure 49:
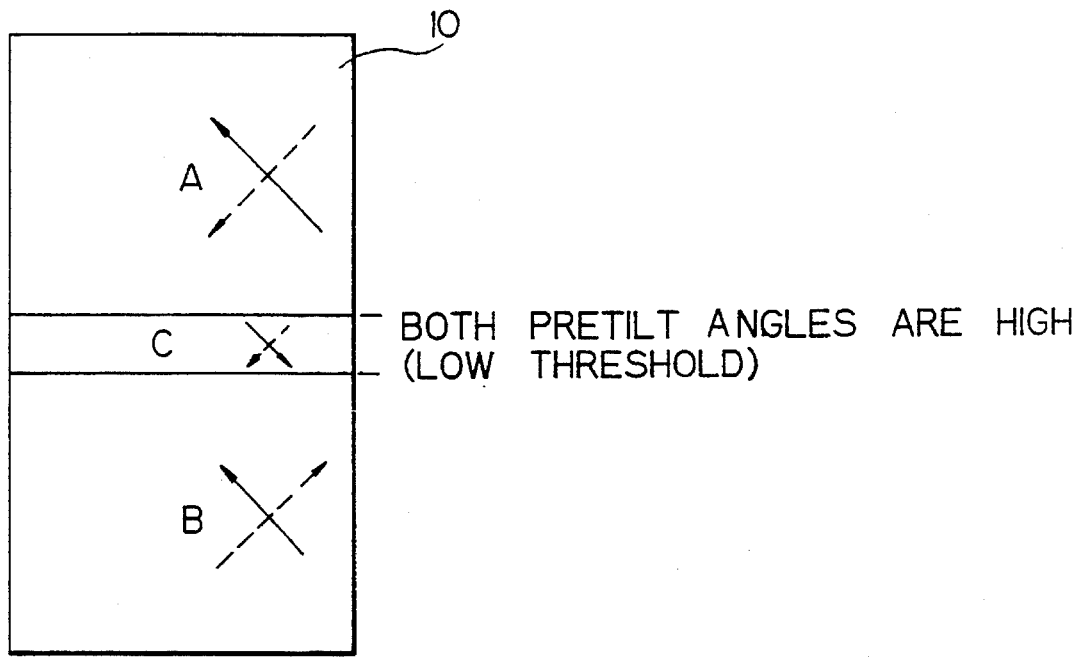
FIG. 49 is a view of a further modification of FIG. 43.

FIGS. 43 and 44 show the ninth embodiment of the present invention. In this embodiment, the liquid crystal aligning domain A and B are subdivided by a third liquid crystal aligning domain C in which molecules of the liquid crystal 20 are aligned in a different manner from molecules of the liquid crystal 20 in the first and second liquid crystal aligning domains A and B. As shown in FIGS. 44 and 49, in the third liquid crystal aligning domain C, the upper and lower alignment layers 26 and 22 are treated differently from the liquid crystal aligning domains A and B. In the embodiment, a portion 22p of the lower alignment layer 22 and a portion 26p of the upper alignment layer 26 corresponding to the third liquid crystal aligning domain C are treated so that molecules of the liquid crystal 20 rise easily to the greatest extent. Since the disclination occurs because molecules of the liquid crystal 20 at the boundary between the liquid crystal aligning domains A and B do not rise easily, it is possible to decrease the disclination by arranging this portion so that molecules of the liquid crystal rise easily.

Figure 45:
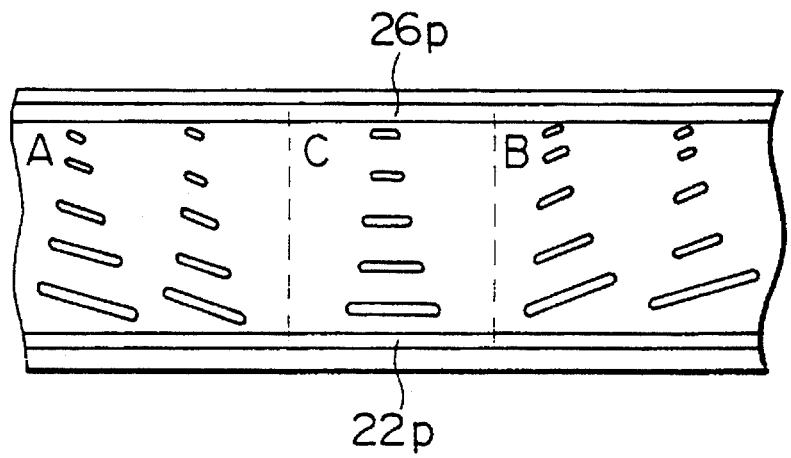
FIG. 45 is a cross-sectional view of a modification of FIG. 43 when the applied voltage is zero.
Figure 46:
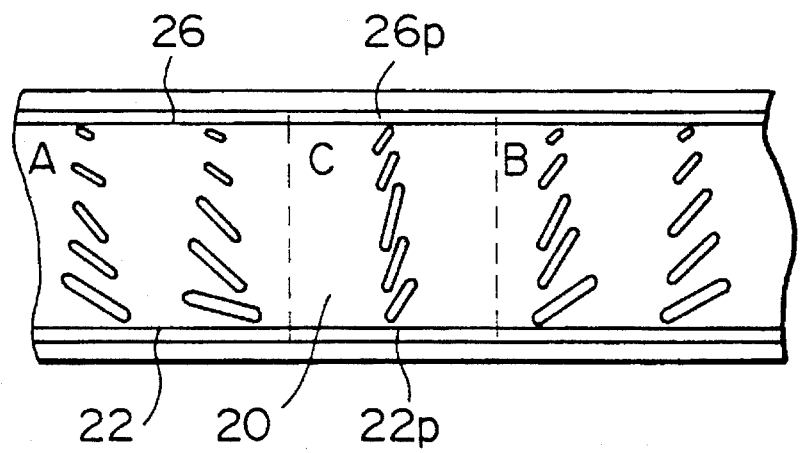
FIG. 46 is a cross-sectional view of FIG. 45, when the liquid crystal rises.

FIGS. 45 and 46 show an example of the arrangement in which molecules of the liquid crystal rise easily. In this example, a portion 22p of the lower alignment layer 22 and a portion 26p of the upper alignment layer 26 corresponding to the third liquid crystal aligning domain C are treated so that these portions 22p and 26p have a restricting force that is weak in a direction parallel to the alignment layers 22 and 26.

Figure 47:
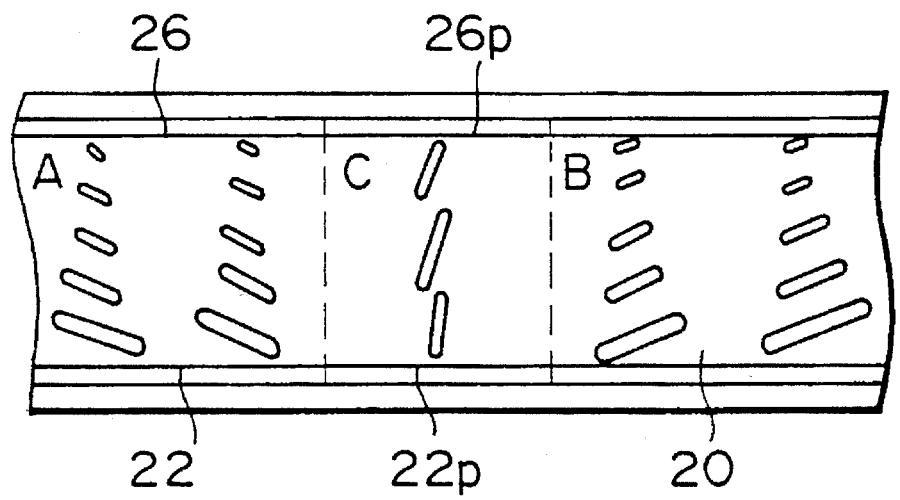
FIG. 47 is a cross-sectional view of a modification of FIG. 43.
Figure 48:
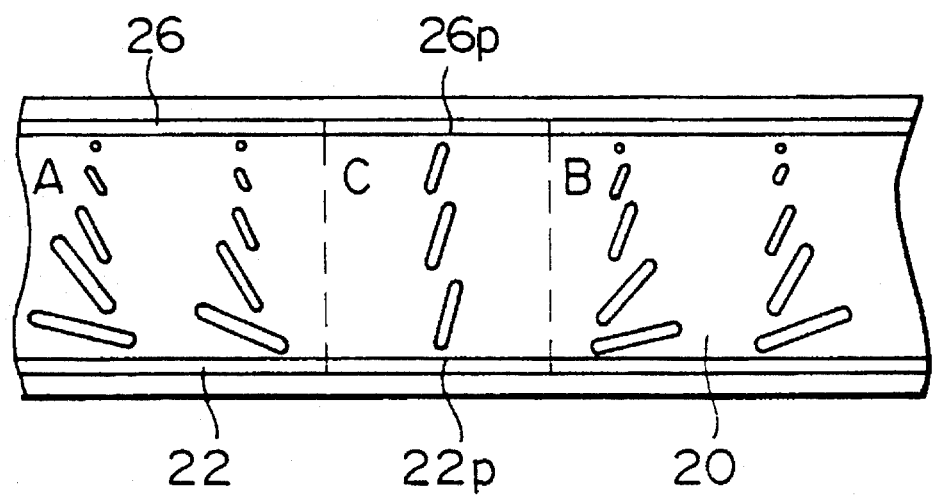
FIG. 48 is a cross-sectional view of FIG. 47, when the driving voltage is applied.

FIGS. 47 and 48 show an example of the arrangement in which molecules of the liquid crystal rise easily. In this example, a portion 22p of the lower alignment layer 22 and a portion 26p of the upper alignment layer 26 corresponding to the third liquid crystal aligning domain C are treated so that these portions 22p and 26p have a perpendicular alignment treatment (homeotropic) so that molecules of the liquid crystal 20 align perpendicular to the alignment layers 22 and 26. In this case, a perpendicular alignment material such as a silane coupling agent can be used.

Figure 50:
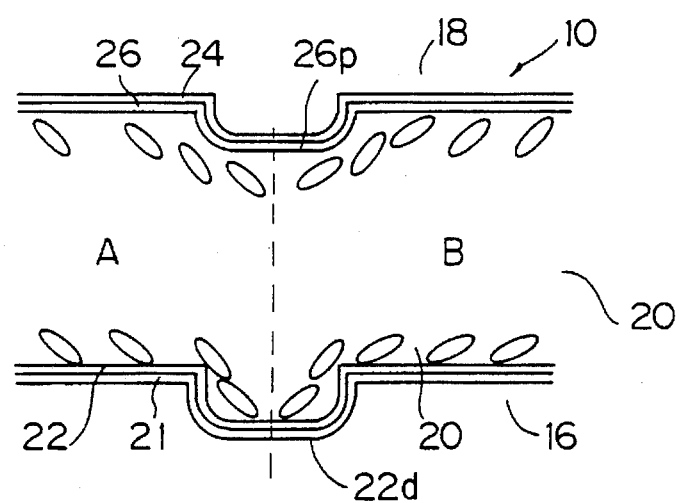
FIG. 50 is a cross-sectional view of a liquid crystal display device according to the tenth embodiment of the present invention.

FIG. 50 shows the tenth embodiment of the present invention. In this embodiment, the upper aligning layer 26 has a portion 26p projecting toward the liquid crystal 20 along the boundary between the liquid crystal aligning domains A and B, and the lower aligning layer 22 has a portion 22p correspondingly depressed from the liquid crystal 20 along the boundary between the liquid crystal aligning domains A and B.

The liquid crystal 20 has a tendency to align depending on the surface shape of a structure that the liquid crystal 20 contacts. Accordingly, as shown in FIG. 50, molecules of the liquid crystal 20 located near the respective glass plate 16 and 18 at the corners of the portions 22p and 26p are aligned obliquely to the corners of the portions 22p and 26p and this alignment coincides with the alignment caused by the rubbing directions. Accordingly, the portions 22p and 26p of the alignment layers 22 and 26 help the alignment of the liquid crystal 20 to improve the behavior of the liquid crystal 20 at the boundary between the liquid crystal aligning domains A and B.

Figure 51:
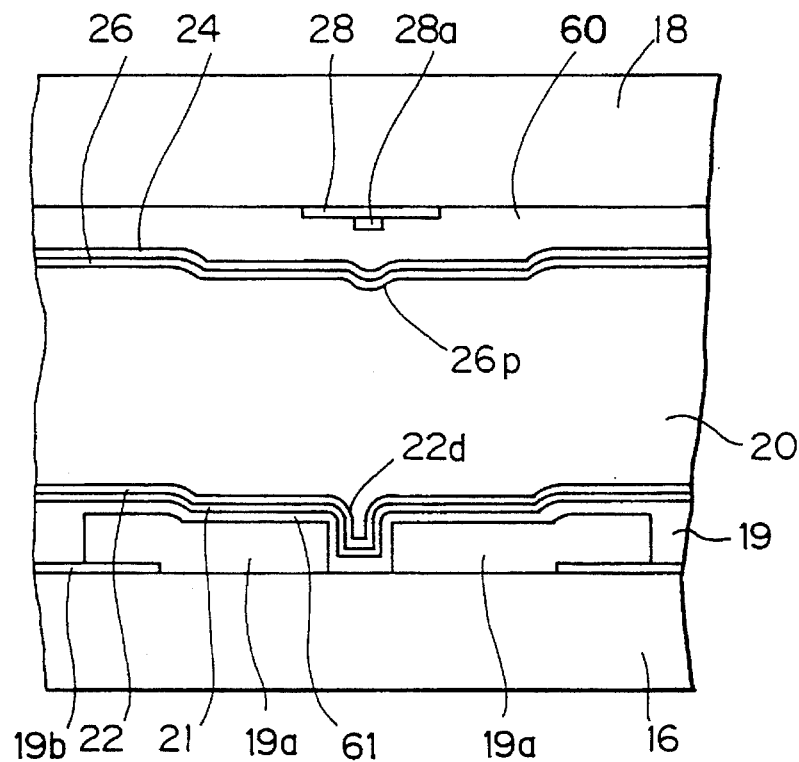
FIG. 51 is a view of a modification of FIG. 50.

FIG. 51 shows an example of forming the irregular portions 22p and 26p. The storage capacitance electrode 28 is arranged at the boundary between the liquid crystal aligning domains A and B in an overlapping relationship with the pixel electrode 24 via the insulating layer 60, with the alignment layer 26 being deposited on the pixel electrode 24. As can be seen, the storage capacitance electrode 28 projects on the upper glass plate 18, and the pixel electrode 24 and the alignment layer 26 correspondingly project. Thus the projecting portion 22p is formed. It is possible to provide a projection 28a on the storage capacitance electrode 28 to fit the projecting portions 22p into a desired shape. Also, it is possible to use the data and gate bus lines 30 and 32 on the projecting portions 22p of the alignment layer 26. The lower glass plate 16 has the color filter 19 having discontinuously arranged color portions 19a. The color filter 19 is covered by the overcoating layer 61 on which the common electrode 21 and the lower alignment layer 22 are deposited. There is a gap between the color portions 19a and the depressing portion 22a of the alignment layer 22 formed at this gap.

Figure 52:
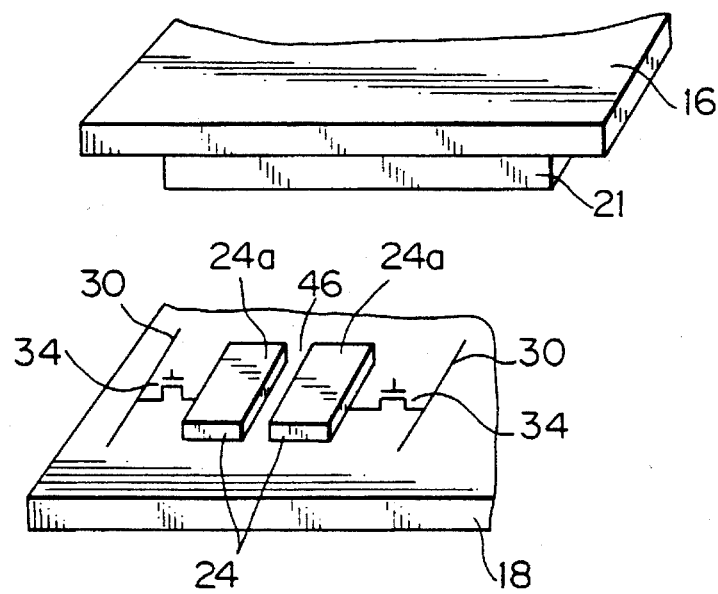
FIG. 52 is a perspective view of a liquid crystal display device according to the eleventh embodiment of the present invention.
Figure 53:
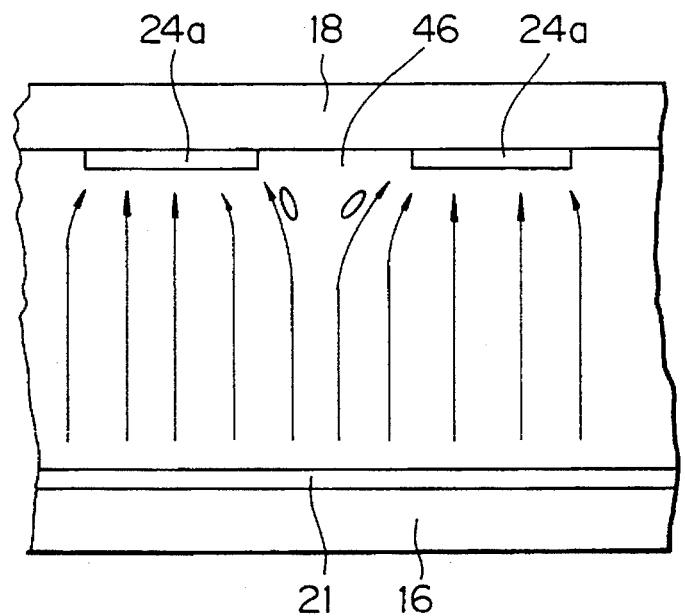
FIG. 53 is a view illustrating the effect of the oblique lines of an electric force of FIG. 52.
Figure 54:
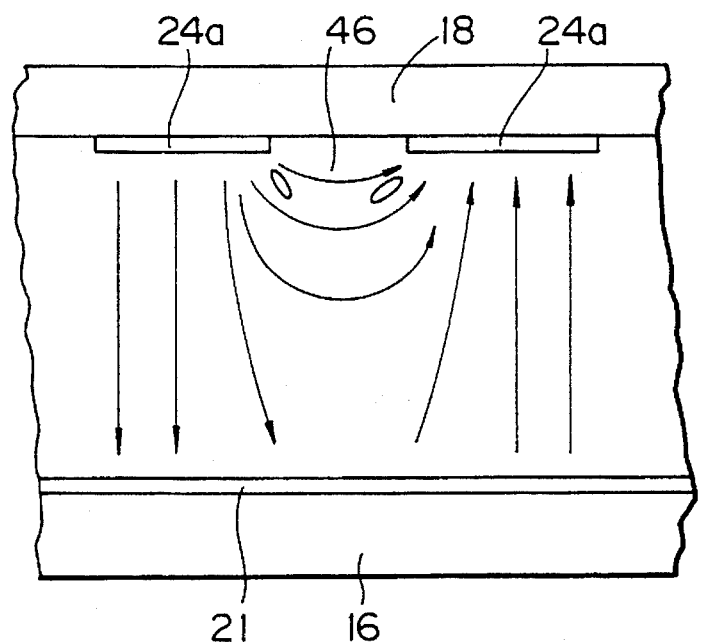
FIG. 54 is a view illustrating the further effect of the oblique lines of an electric force of FIG. 52.

FIGS. 52 to 54 show the eleventh embodiment of the present invention. In this embodiment, one pixel electrode 24 is a unit region forming the liquid crystal aligning domains A and B and subdivided into two sub-pixel electrodes 24a spaced by a predetermined gap 46 therebetween. The sub-pixel electrodes 24a are connected to the data bus lines 30 via the transistors 34, respectively. As described with reference to FIG. 18, the alternating voltage $V_{30}$ is applied to the data bus lines 30 and thus to the sub-pixel electrode 24a to form an electric field between the pixel electrode 24 and the common electrode 21. FIG. 53 shows lines of electric force when the sub-pixel electrodes 24a are supplied with voltage of the same polarity, and FIG. 54 shows lines of electric force when the sub-pixel electrodes 24a are supplied with voltage of different polarity (the peak and the valley of the alternating voltage $V_{30}$). In each case, there are oblique lines of electric force that serve to align molecules of the liquid crystal 20, in a manner described with reference to FIG. 13.

Figure 55:
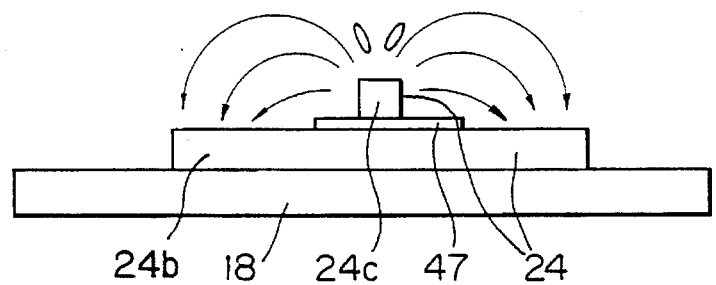
FIG. 55 is a view of a modification of FIG. 52.

FIG. 55 shows a modification of the arrangement of FIG. 52. In this example, the pixel electrode 24 comprises two sub-electrodes 24b and 24c. The sub-pixel electrode 24c has a smaller area than that of the sub-pixel electrode 24b and overlaps on the sub-pixel electrode 24b via an insulating layer 47 so that lines of electric force appear oblique to the sub-pixel electrodes 24b and 24c.

Figure 56:
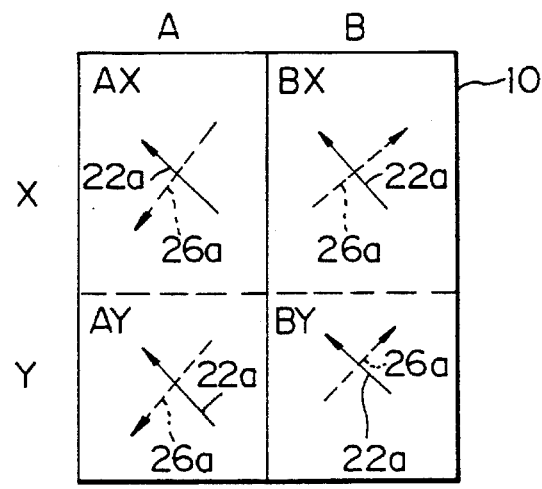
FIG. 56 is a diagrammatic plan view of a liquid crystal display device according to the twelfth embodiment of the present invention.
Figure 57A:
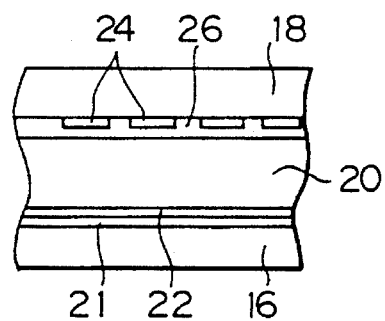
FIGS. 57A and 57B are cross-sectional views of the sub-divided domains of FIG. 56.
Figure 57B:
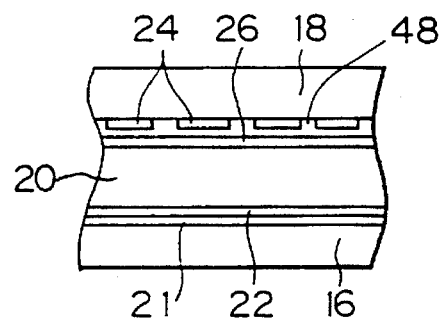

FIG. 56 to 57B show the twelfth embodiment of the present invention. In this embodiment, the liquid crystal display device comprises a plurality of unit regions each of which is divided into two liquid crystal aligning domains A and B. Each of the liquid crystal aligning domains A and B is subdivided into third and fourth sub-domains X and Y having different threshold voltages. That is, the liquid crystal aligning domain A includes sub-domains AX and AY having different threshold voltages, and the liquid crystal aligning domain B includes sub-domains BX and BY having different threshold voltages.

FIG. 57A shows a cross-sectional view of the sub-domain X and FIG. 57B shows a cross-sectional view of the sub-domain Y. In FIG. 57A, there are the lower alignment layer 22 on the common electrode 21, and the upper alignment layer 26 on the pixel electrode 24. In this case, the threshold voltage of the liquid crystal 20 is determined by the total dielectric constant of the liquid crystal 20 and the alignment layers 22 and 26. In FIG. 57B, there are the lower alignment layer 22 on the common electrode 21, and the upper alignment layer 26 on the pixel electrode 24 via a dielectric layer 48. In this case, the threshold voltage of the liquid crystal 20 is determined by the total dielectric constant of the liquid crystal 20, the alignment layers 22 and 26 and the dielectric layer 48. Accordingly, the threshold voltage of the liquid crystal 20 in the sub-domain X differs from that in the sub-domain Y.

Figure 58:
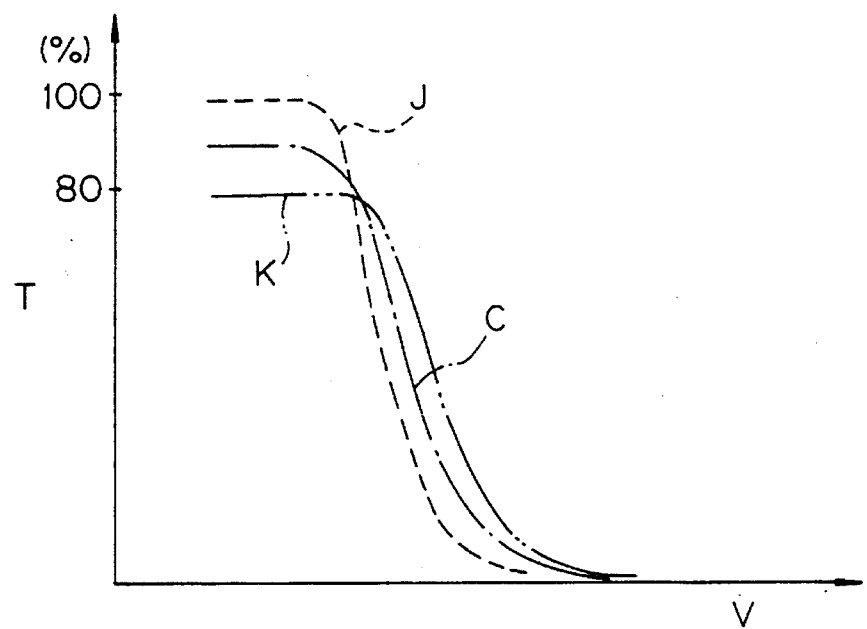
FIG. 58 is a T-V (transmittance versus voltage) characteristic of a viewing angle of the device of FIG. 56, viewed from the front.
Figure 59:
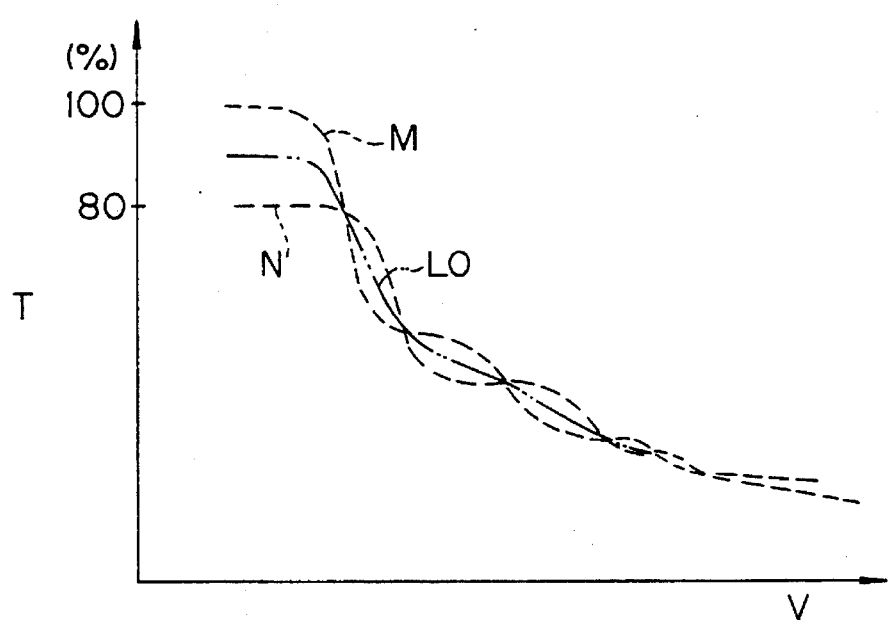
FIG. 59 is a T-V characteristic of a viewing angle of the device of FIG. 56, viewed obliquely.

FIG. 58 shows the characteristic of the viewing angle when viewed from the front, normal to the display. The broken curve C corresponds to the curve C in FIG. 6B. The broken curves J and K show the characteristic of the sub-domains X and Y, respectively, when viewed from the same direction as of the broken curve C. In FIG. 59, the broken curves M and N show the characteristic of the viewing angle of the sub-domains X and Y, when viewed from below, i.e., from the direction corresponding to the broken curve L in FIG. 6B.

In FIG. 56, the areas of the first and second liquid crystal aligning domains A and B are the same. The areas of the third and fourth sub-domains X and Y in each of the liquid crystal aligning domains A and B are different. In the embodiment, the area of the third sub-domain X having the first threshold voltage is larger than the area of the fourth sub-domain Y having the second threshold voltage, the ratio of the areas being 5 to 4. Accordingly, if the 100 percent light passes through the third sub-domain X, the 80 percent light transmits the fourth sub-domain Y, which is reflected in FIGS. 58 and 59 where the curves J and M have higher values when the voltage is low.

In addition, the fourth sub-domain Y, which has a smaller area than that of the third sub-domain X, has a higher threshold voltage than that of the third sub-domain X. In the embodiment, the ratio of the threshold voltage is 1 to 1.2. Since the fourth sub-domain Y having the higher threshold voltage is one having the dielectric layer 48, the effective voltage applied to the liquid crystal 20 becomes low compared with the case in which the same voltage is applied to the third sub-domain X. To have the higher threshold voltage means to shift the characteristic curve of the transmittance versus the voltage toward the high voltage region.

Accordingly, the broken curves K and N of the characteristic of the fourth sub-domain Y having a smaller area and higher threshold voltage have lower transmittance values at the low voltage region, and then higher transmittance values with an increase in the voltage, compared with the broken curves J and M of the characteristic of the third sub-domain X, having a larger area and lower threshold voltage. The curves J and K, and M and N approach each other and cross.

In FIG. 59 the average of the broken curves M and N showing the characteristic of the low viewing angle is the broken curve L0, which is closer to the broken line C showing the characteristic of the normal viewing angle than the broken curve L of FIG. 6B where the liquid crystal aligning domains A and B are not subdivided into third and fourth sub-domains X and Y. Similarly, a compensating curve (not shown) showing the characteristic of the high viewing angle becomes closer to the broken line C showing the characteristic of the normal viewing angle than the broken curve U. Accordingly, the average curve of the broken curve L0 and the compensating curve is closer to the solid curve I of FIG. 6B, and smoother than the solid curve I thereby canceling the lobes of the solid curve I. Accordingly, it is possible to further improve the characteristic and the contrast ratio.

Figure 60:
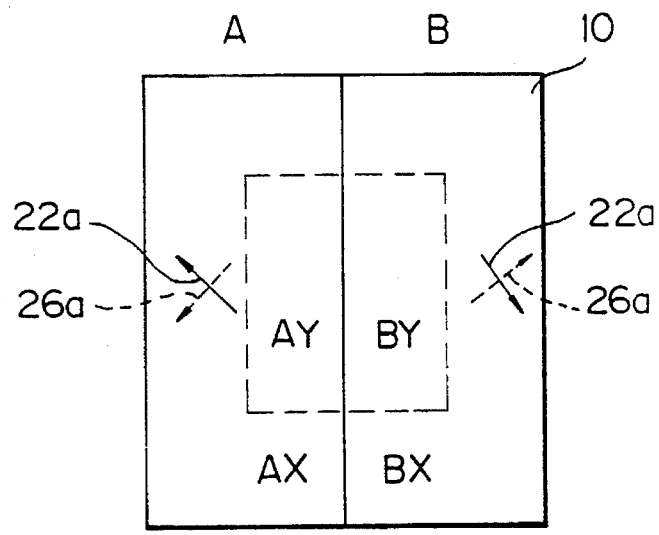
FIG. 60 is a diagrammatic plan view of one unit area of a liquid crystal display device according to the thirteenth embodiment of the present invention.

FIG. 60 shows the thirteenth embodiment of the present invention. In FIG. 56, the liquid crystal aligning domains A and B are divided longitudinally, and the third and fourth sub-domains X and Y are subdivided laterally. In this example, the liquid crystal aligning domains A and B are divided longitudinally, and the third and fourth sub-domains X and Y are subdivided into a peripheral portion and a central portion of the liquid crystal aligning domains A and B.

Figure 61:
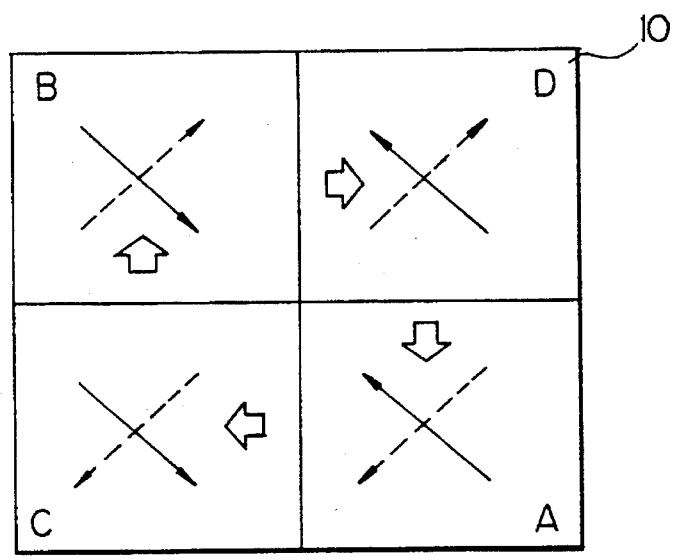
FIG. 61 is a diagrammatic plan view of one unit area of a liquid crystal display device according to the fourteenth embodiment of the present invention.

FIG. 61 shows the fourteenth embodiment of the present invention. In this embodiment, each of the minute unit regions includes third and fourth different liquid crystal aligning domains C and D in addition to the first and second different liquid crystal aligning domains A and B. The liquid crystal of the first and second different liquid crystal aligning domains A and B a twisting nature in the direction of one of left-turning and right-turning. The liquid crystal of the third and fourth different liquid crystal aligning domains C and D has a twisting nature in the direction of the other of left-turning and right-turning.

We claim:

1. A liquid crystal display device comprising:

first and second opposed plates having facing inner surfaces;

a first electrode means and a first alignment layer means arranged on the inner surface of the first plate;

a second electrode means and a second alignment layer means arranged on the inner surface of the second plate;

a liquid crystal inserted between the first and second plates and having a twisting nature between the first and second plates;

the first and second alignment layer means, together forming a plurality of minute unit regions each of which is divided into first and second different liquid crystal aligning domains; and the first and second alignment layer means being arranged and treated so that in the first liquid crystal aligning domain, molecules of the liquid crystal near the first alignment layer means are aligned along a first line with a first pretilt direction and a first pretilt angle and molecules of the liquid crystal near the second alignment layer means are aligned along a second line perpendicular to the first line with a second pretilt direction and a second pretilt angle, the second pretilt direction being generally opposite to the first pretilt direction and the first pretilt angle being larger than the second pretilt angle, and so that in the second liquid crystal alligning domain, molecules of the liquid crystal near the second alignment layer means are aligned along the second pretilt direction, whereby molecules of the liquid crystal located intermediately.

between the first and second plates substantially align with the first pretilt angle when the voltage is applied between the first and second electrode means.

2. A liquid crystal display device according to claim 1, wherein the first and second alignment layer means are treated by rubbing.

3. A liquid crystal display device according to claim 1, wherein the liquid crystal comprises a twisted nematic type liquid crystal.

4. A liquid crystal display device according to claim 1, wherein the difference between the first and second pretilt angles is larger than two degrees.

5. A liquid crystal display device according to claim 1, wherein the first alignment layer means is arranged and treated so that molecules of the liquid crystal near said first alignment layer means in the second liquid crystal aligning domain are aligned along the first line with the second pretilt direction and the first pretilt angle; and wherein the second alignment layer means is arranged and treated so that molecules of the liquid crystal near the second alignment layer means in both the first and second liquid crystal aligning domains are aligned along the second line with the second pretilt direction.

6. A liquid crystal display device according to claim 5, wherein the second alignment layer means to arranged and treated so that molecules of the liquid crystal near the second alignment layer means in both the first and second liquid crystal aligning domains are aligned substantially at the second pretilt angle.

7. A liquid crystal display device according to claim 1, wherein the first alignment layer means is arranged and treated so that molecules of the liquid crystal near the first alignment layer means in the second liquid crystal aligning domain are aligned along the first line with the first pretilt direction and the second pretilt angle; and wherein the second alignment layer means is arranged and treated so that molecules of the liquid crystal near the second alignment layer means in the second liquid crystal aligning domain are aligned along the second line with the second pretilt direction and the first pretilt angle.

8. A liquid crystal display device according to claim 1, wherein the first alignment layer means is arranged and treated so that molecules of the liquid crystal near the first alignment layer means in the second liquid crystal aligning domain are aligned along the first line with the first pretilt direction and a third pretilt angle, the third pretilt angle being smaller than the second pretilt angle; and wherein the second alignment layer means is arranged and treated so that molecules of the liquid crystal near the second alignment layer means both in the first and second liquid crystal aligning domains are aligned along the second line with the second pretilt direction and the second pretilt angle.

9. A liquid crystal display device according to claim 1, wherein the first alignment layer means is arranged and treated so that molecules of the liquid crystal near the first alignment layer means in the second liquid crystal aligning domain are aligned along the first line with the second pretilt direction; and wherein the second alignment layer means is arranged and treated so that molecules of the liquid crystal near the second alignment layer means both in the first and second liquid crystal aligning domains are aligned along the second line with the second pretilt direction and the second pretilt angle.

10. A liquid crystal display device according to claim 1, wherein at least one of the first and second alignment layer means comprises a first alignment layer laminated on the associated plate and a second alignment layer laminated on the first alignment layer and having openings corresponding with one of the first and second liquid crystal aligning domains.

11. A liquid crystal display device according to claim 10, wherein the laminated first and second alignment layers are simultaneously treated by rubbing.

12. A liquid crystal display device according to claim 10, the second alignment layer is treated by rubbing, then the first alignment layer is treated by rubbing after the second alignment layer is masked and the openings are formed on the second alignment layer.

13. A liquid crystal display device according to claim 10, wherein the first alignment layer comprises an inorganic material and the second alignment layer comprises an organic material.

14. A liquid crystal display device according to claim 10, wherein the first and second alignment layers comprise organic materials having different liquid crystal aligning characteristics.

15. A liquid crystal display device according to claim 1, wherein one of the first and second alignment layer means comprises one of the first and second electrode means, which is treated by rubbing, and the other alignment layer means comprises an alignment layer laminated on the other electrode means.

16. A liquid crystal display device according to claim 1, wherein each of the first and second alignment layer means comprises an alignment layer laminated on the respective electrode means and having openings corresponding with one of the first and second liquid crystal aligning domains.

17. A liquid crystal display device according to claim 1, wherein at least one of the first and second alignment layer means comprises an alignment layer and a lower structure to which the alignment layer is laminated with an adhesive force; the extent of adhesion of the alignment layer to the lower structure being varied for the first and second liquid crystal aligning domains for changing the pretilt angles thereat.

18. A liquid crystal display device according to claim 17, wherein the lower structure comprises an adhesion improving agent by which the extent of adhesion is varied.

19. A liquid crystal display device according to claim 17, wherein the lower structure is subjected to a surface treatment by which the extent of adhesion is varied.

20. A liquid crystal display device according to claim 1, wherein one of the first and second electrode means comprises a common electrode and the other electrode means comprises a plurality of pixel electrodes, bus lines, and active transistors connected between the pixel electrodes and the bus lines, respectively.

21. A liquid crystal display device according to claim 20, wherein the first and second liquid crystal aligning domains are divided by a boundary line extending on the substantial center line of each of the pixel electrodes.

22. A liquid crystal display device according to claim 20, wherein the first and second liquid crystal aligning domains are divided by a boundary line extending on the bus line, and the first and second alignment layer means are arranged and treated so that molecules of the liquid crystal near the first alignment layer means in the first liquid crystal aligning domain rise to face toward the bus line.

23. A liquid crystal display device according to claim 20, wherein the first and second liquid crystal aligning domains are formed in an elongated strip-like shape so that molecules of the liquid crystal located intermediately between the first and second plates in the first and second liquid crystal aligning domains extend parallel to the elongated strip-like shape.

24. A liquid crystal display device according to claim 23, wherein the first and second liquid crystal aligning domains are divided by a boundary line extending parallel to the bus lines.

25. A liquid crystal display device according to claim 20, wherein the first and second liquid crystal aligning domains are divided by a boundary line, and a shading layer is arranged along the boundary line.

26. A liquid crystal display device according to claim 25, wherein said device further comprises a storage capacitance electrode in an overlapping relationship with the pixel electrode, the storage capacitance electrode constituting the shading layer.

27. A liquid crystal display device according to claim 25, wherein at least a part of the bus lines are arranged so as to constitute the shading layer.

28. A liquid crystal display device according to claim 25, wherein one of the first and second plates has bus lines arranged in a matrix, and the other plate has the shading layer.

29. A liquid crystal display device according to claim 25, wherein the shading layer comprises a black matrix.

30. A liquid crystal display device according to claim 25, wherein one of the first and second plates has first shading layers occupying positions in a layer direction which are spaced from one another a first distance, and the other plate has second shading layers occupying positions in the layer direction which are spaced from one another a second distance, the first shading layers and the second shading layers occupying different positions in the layer direction.

31. A liquid crystal display device according to claim 1, wherein the first and second liquid crystal aligning domains are divided by a third liquid crystal aligning domain in which molecules of the liquid crystal align in a different manner from molecules of the liquid crystal in the first and second liquid crystal aligning domains.

32. A liquid crystal display device according to claim 31, wherein molecules of the liquid crystal in the third liquid crystal aligning domain align to a greater extent than those in the first and second liquid crystal aligning domains.

33. A liquid crystal display device according to claim 1, wherein one of the first and second aligning layer means has a portion projecting toward or depressing from the liquid crystal along a boundary between the first and second liquid crystal aligning domains, and the other of the first and second aligning layer means has a portion correspondingly depressed from or projecting toward the liquid crystal along the boundary between the first and second liquid crystal aligning domains.

34. A liquid crystal display device according to claim 33, wherein said device further comprises a storage capacitance electrode in an overlapping relationship with the pixel electrode; the storage capacitance electrode being arranged at the boundary between the first and second liquid crystal aligning domains thereby causing said portion of the first and second aligning layer means to project toward the liquid crystal.

35. A liquid crystal display device according to claim 33, wherein said device further comprises a color filter having discontinuously arranged color portions; the discontinuity of the color filter causing said portion of the first and second aligning layer means to be depressed from the liquid crystal.

36. A liquid crystal display device according to claim 20, wherein each of the plurality of minute unit regions having the first and second liquid crystal aligning domains therein has an area of one pixel, each of the plurality of minute regions has two electrodes, and each of the electrodes is connected to a different active element, the active elements being arranged at a symmetrical positions regarding the center of the unit region.

37. A liquid crystal display device according to claim 20, wherein, in each of the plurality of minute unit regions, each of the electrodes is divided into two sub-electrodes spaced a predetermined gap therebetween so that lines of electric force appear obliquely to the sub-electrodes.

38. A liquid crystal display device according to claim 20, wherein, in each of the plurality of minute unit regions, each of the electrodes has another electrode, having a smaller area than that of the electrode and overlapping the electrode via an insulating layer so that lines of electric force appear obliquely to the electrodes which are generally pixel or common electrodes.

39. A liquid crystal display device according to claim 1, wherein for each minute region, each of the first and second liquid crystal aligning domains is divided into two or more sub-domains having different threshold voltages.

40. A liquid crystal display device according to claim 39, wherein for each minute region, the first and second liquid crystal aligning domains have substantially the same area, and, for each of the first and second liquid crystal aligning domains one of the sub-domains has an area different from that of the other sub-domain in the same liquid crystal aligning domain.

41. A liquid crystal display device according to claim 40, wherein the one of the sub-domains which has a smaller area than that of the other sub-domain has a higher threshold voltage than that of the other sub-domain.

42. A liquid crystal display device according to claim 1, wherein each of the minute unit regions includes third and fourth different liquid crystal aligning domains in addition to the first and second different liquid crystal aligning domains; the liquid crystal of the first and second different liquid crystal aligning domains has a twisting nature in one of the left-turning and right-turning directions and the liquid crystal of the third and fourth different liquid crystal aligning domains has a twisting nature in the remaining of left-turning and right-turning directions.

43. A liquid crystal display device comprising:

first and second opposed plates having facing inner surfaces;

a first electrode means and a first alignment layer means arranged on the inner surface of the first plate:

a second electrode means and a second alignment layer means arranged on the inner surface of the second plate;

a liquid crystal inserted between the first and second plates and having a twisting nature between the first and second plates;

the first and second alignment layer means, together forming a plurality of minute unit regions, each of the minute unit regions being divided approximately along a center line thereof into first and second different liquid crystal aligning domains such that molecules of the liquid crystal located intermediately between the first and second plates in the first liquid crystal aligning domain are aligned in a first pretilt direction and molecules of the liquid crystal located intermediately between the first and second plates in the second liquid crystal aligning domain are aligned in a second pretilt direction opposite the first pretilt direction;

the first and second liquid crystal aligning domains being divided by a boundary line, and a shading layer being arranged along the boundary line; and one of the first and second plates having first shading layers occupying positions in a layer direction which are spaced from one another a first distance, and the other plate having second shading layers occupying positions in the layer direction which are spaced from one another a second distance, the first shading layers and the second shading layers occupying different positions in the layer direction.

* * * * *

UNITED STATES PATENT AND TRADEMARK OFFICE
CERTIFICATE OF CORRECTION

PATENT NO. : 5,473,455
DATED : December 5, 1995
INVENTOR(S) : Yoshio KOIKE, et al.

It is certified that error appears in the above-indentified patent and that said Letters Patent is hereby corrected as shown below:

Column 23,     line 24     change "alligning" to --aligning-- line 27     delete "."

line 28     "between" does not start a new paragraph

Column 26,     line 34     delete "a"

line 56     insert --,-- after "domains".

Signed and Sealed this

Ninth Day of April, 1996

Attest:

BRUCE LEHMAN

Attesting Officer     Commissioner of Patents and Trademarks